United States Patent
Wexler et al.

(10) Patent No.: US 9,965,269 B2
(45) Date of Patent: May 8, 2018

(54) SYSTEMS AND METHODS FOR DETERMINING AND DISTRIBUTING AN UPDATE TO AN INFERENCE MODEL FOR WEARABLE APPARATUSES

(71) Applicant: OrCam Technologies Ltd., Jerusalem (IL)

(72) Inventors: Yonatan Wexler, Jerusalem (IL); Amnon Shashua, Mevaseret Zion (IL)

(73) Assignee: OrCam Technologies Ltd., Jerusalem (IL)

( * ) Notice: Subject to any disclaimer, the term of this patent is extended or adjusted under 35 U.S.C. 154(b) by 0 days. days.

(21) Appl. No.: 15/478,850

(22) Filed: Apr. 4, 2017

(65) Prior Publication Data
US 2017/0293480 A1    Oct. 12, 2017

Related U.S. Application Data

(60) Provisional application No. 62/318,782, filed on Apr. 6, 2016.

(51) Int. Cl.
| | |
|---|---|
| *G06F 9/44* | (2018.01) |
| *G06F 9/445* | (2018.01) |
| *H04L 29/08* | (2006.01) |
| *H04B 1/3827* | (2015.01) |

(52) U.S. Cl.
CPC ............... *G06F 8/65* (2013.01); *H04B 1/385* (2013.01); *H04L 67/34* (2013.01)

(58) Field of Classification Search
CPC ............ G06F 8/65; H04B 1/385; H04L 67/34
See application file for complete search history.

(56) References Cited

U.S. PATENT DOCUMENTS

| | | | | |
|---|---|---|---|---|
| 8,045,758 | B2* | 10/2011 | Ishikawa | B60W 40/09 382/103 |
| 8,655,109 | B2* | 2/2014 | Lin | G06T 3/4053 382/299 |
| 9,418,283 | B1* | 8/2016 | Natarajan | G06K 9/00463 |
| 2009/0034794 | A1* | 2/2009 | Ishikawa | B60W 40/09 382/103 |
| 2013/0034313 | A1* | 2/2013 | Lin | G06T 3/4053 382/299 |

(Continued)

*Primary Examiner* — Marina Lee
(74) *Attorney, Agent, or Firm* — Finnegan, Henderson, Farabow, Garrett & Dunner, LLP

(57) ABSTRACT

A system and a method determine a global update to an inference model and distribute the global update to a plurality of wearable apparatuses. In one implementation, the system includes a data interface and at least one processing device. The at least one processing device is programmed to receive, via the data interface and from a first one of the plurality of wearable apparatuses, first update information associated with the inference model. The at least one processing device is further programmed to receive, via the data interface and from a second one of the plurality of wearable apparatuses, second update information associated with the inference model. The at least one processing device is further programmed to analyze the first update information and the second update information to determine the global update to the inference model, and transmit, via the data interface, the global update to the plurality of wearable apparatuses.

20 Claims, 27 Drawing Sheets

(56) References Cited

U.S. PATENT DOCUMENTS

| | | | |
|---|---|---|---|
| 2014/0129489 A1* | 5/2014 | Baker | G06Q 10/10 |
| | | | 706/11 |
| 2014/0214735 A1* | 7/2014 | Harik | G06N 99/005 |
| | | | 706/12 |
| 2014/0315168 A1* | 10/2014 | Movellan | A61B 5/165 |
| | | | 434/236 |
| 2015/0242707 A1* | 8/2015 | Wilf | G06K 9/00302 |
| | | | 382/159 |
| 2016/0104070 A1* | 4/2016 | Eslami | G06N 99/005 |
| | | | 706/12 |
| 2016/0259994 A1* | 9/2016 | Ravindran | G06K 9/00 |
| 2017/0293480 A1* | 10/2017 | Wexler | G06F 8/65 |

* cited by examiner

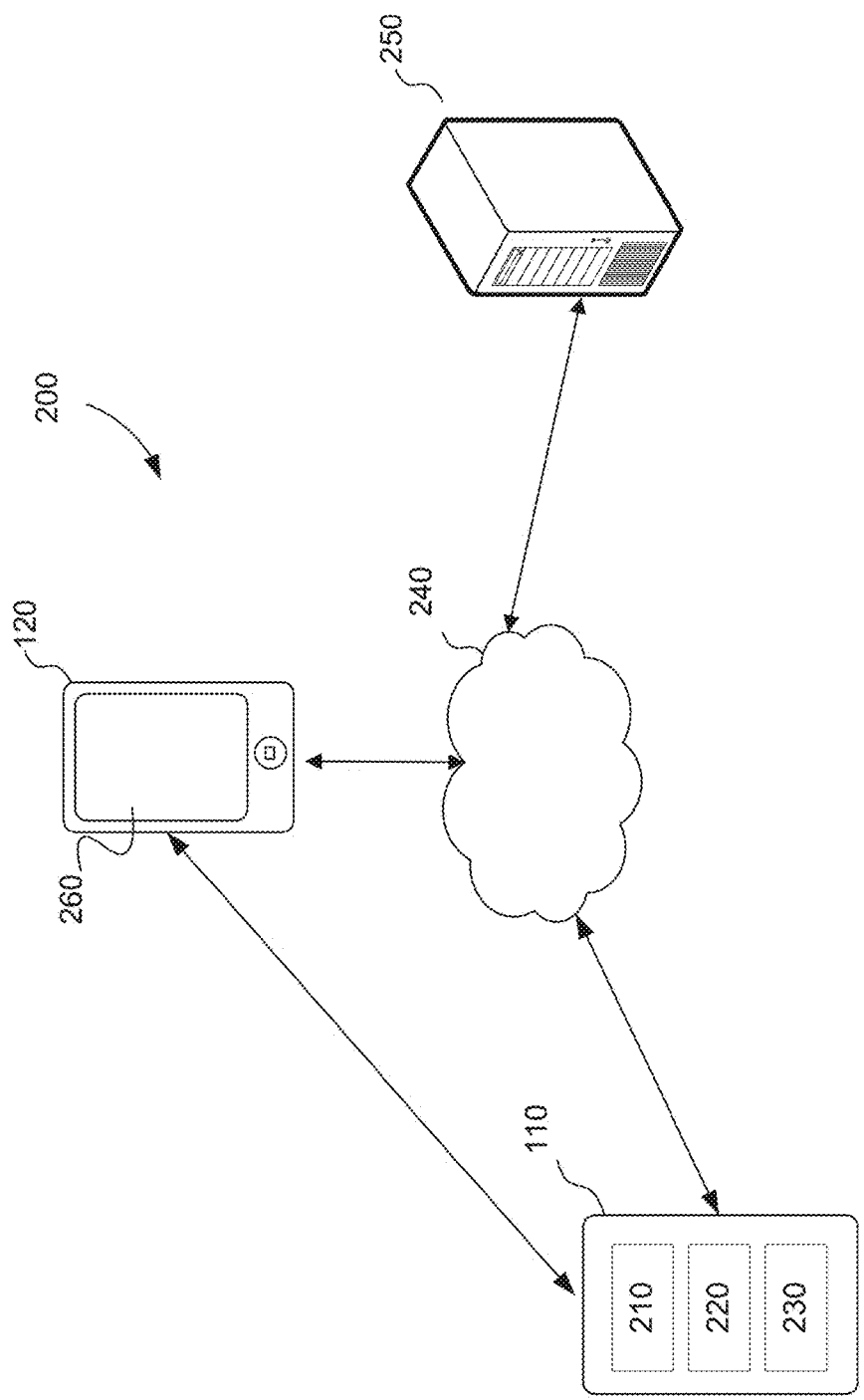

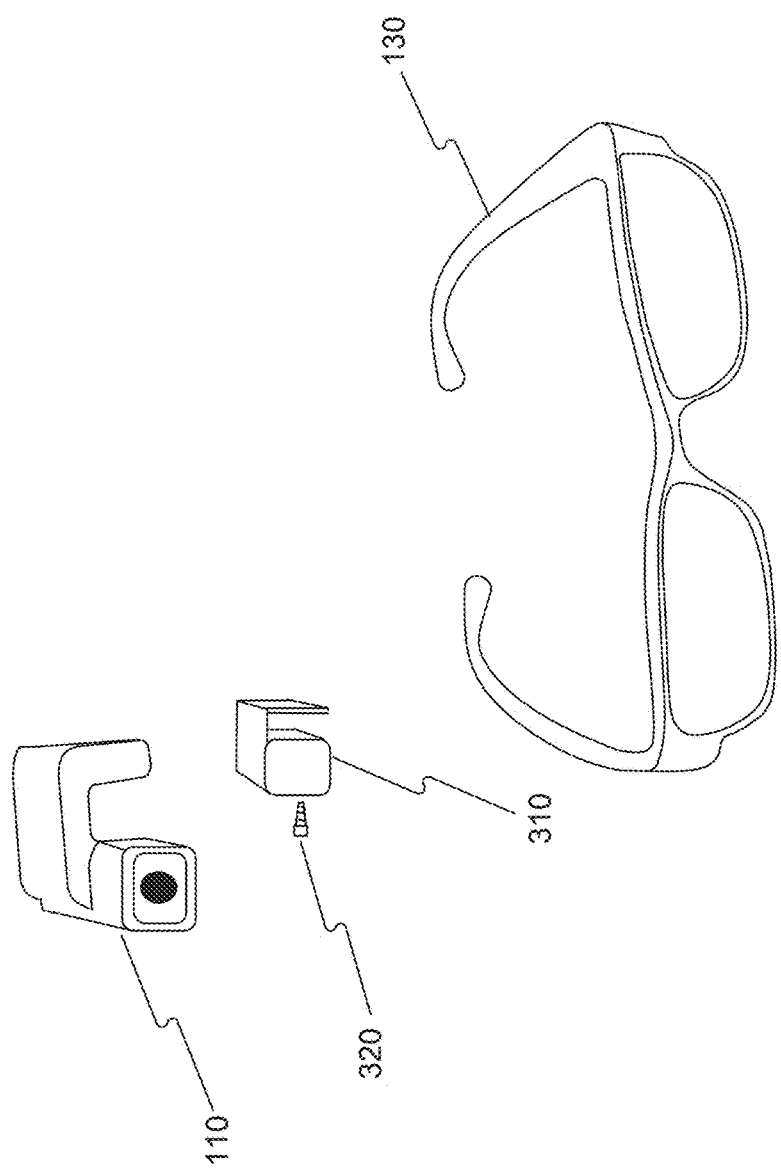

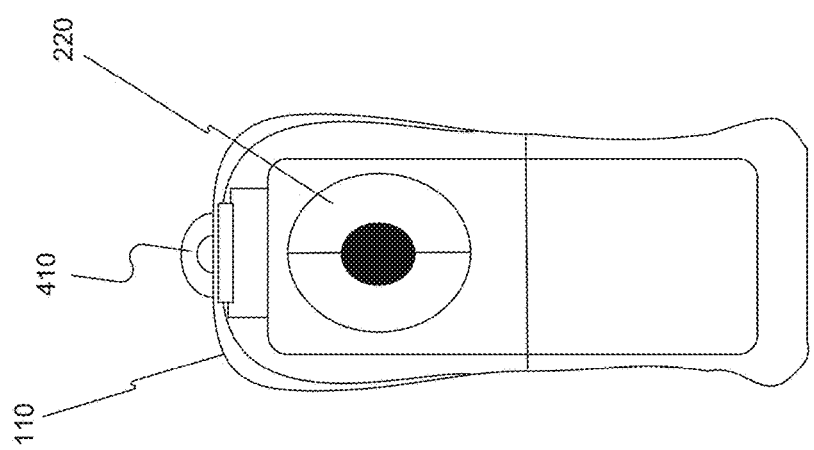

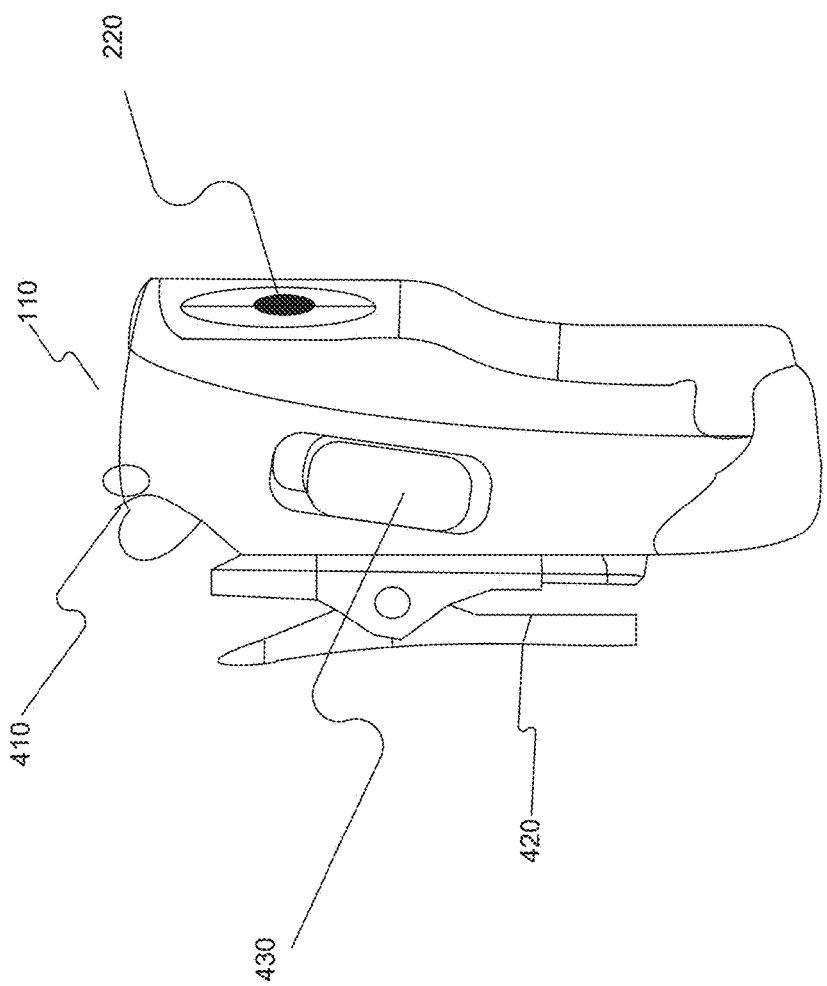

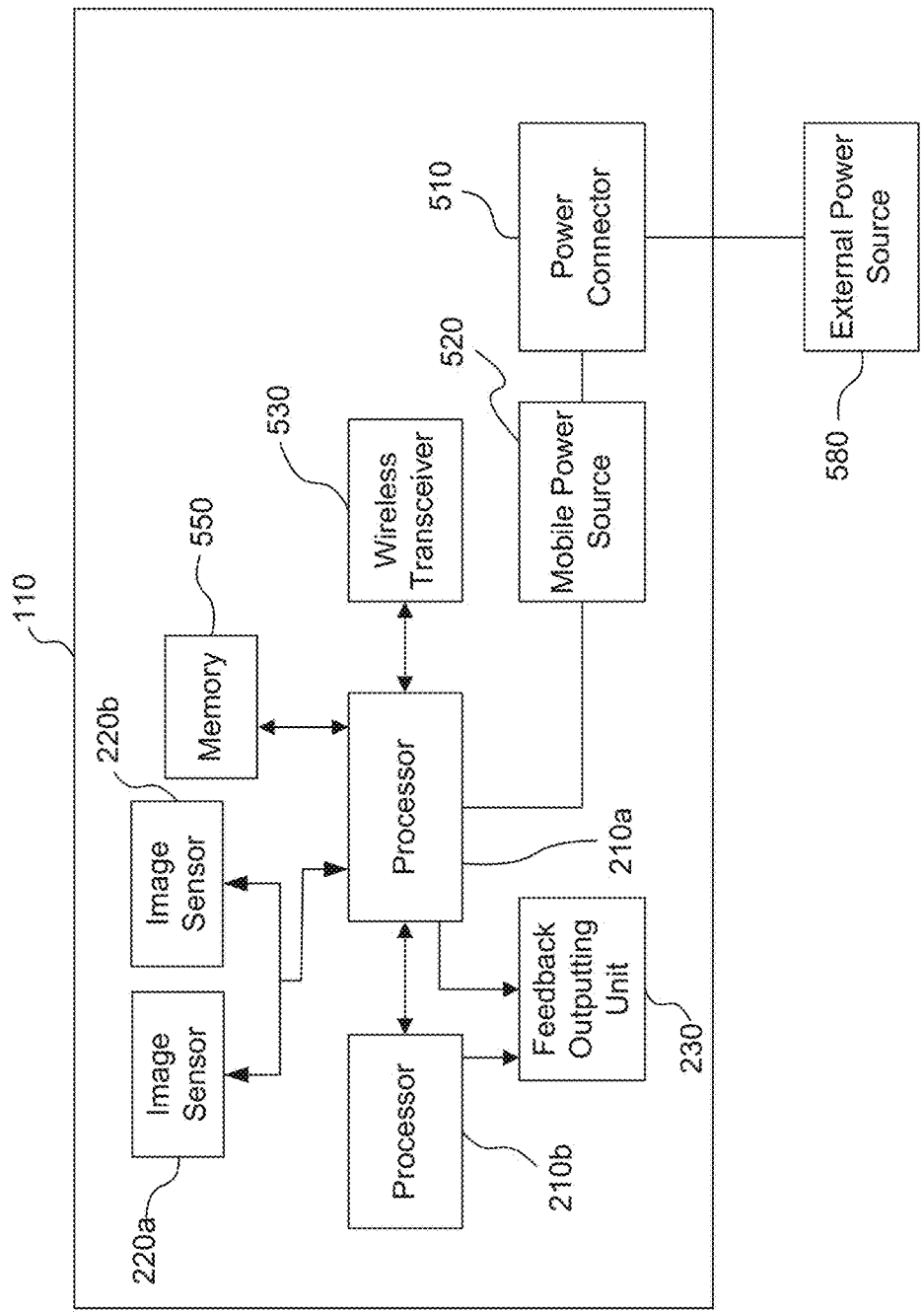

SYSTEMS AND METHODS FOR DETERMINING AND DISTRIBUTING AN UPDATE TO AN INFERENCE MODEL FOR WEARABLE APPARATUSES

CROSS REFERENCE TO RELATED APPLICATION

This application claims the benefit of priority of U.S. Provisional Patent Application No. 62/318,782, filed Apr. 6, 2016, which is incorporated herein by reference in its entirety.

BACKGROUND

Technical Field

This disclosure generally relates to systems and methods for determining and distributing an update to an inference model for a plurality of wearable apparatuses. More particularly, this disclosure relates to determining the update to the inference model while preserving the privacy of the users of the wearable apparatuses.

Background Information

Today, technological advancements make it possible for wearable apparatuses to automatically capture images and store information that is associated with the captured images. Certain devices have been used to digitally record aspects and personal experiences of one's life in an exercise typically called "lifelogging." Some individuals log their life so they can retrieve moments from past activities, for example, social events, trips, etc. Lifelogging may also have significant benefits in other fields (e.g., business, fitness and healthcare, and social research). Lifelogging devices, while useful for tracking daily activities, may be improved with capability to enhance one's interaction in his environment with feedback and other advanced functionality based on the analysis of captured image data. Moreover, with improvements in image capture devices, additional functionality may be provided to assist users in navigating in and around an environment, identifying persons and objects they encounter, and providing feedback to the users about their surroundings and activities.

In order to provide feedback to a user of a wearable apparatus, the wearable apparatus may analyze one or more images captured from the user's environment and classify one or more of the images. However, the image analysis and classification techniques may sometimes result in an erroneous classification of an image (e.g., classifying a bicycle depicted in an image as a motorcycle). It is desirable to correct these errors so the wearable apparatus correctly classifies similar images in the future. Moreover, it is also desirable to correct these errors in such a way that the privacy of the user of the wearable apparatus is not compromised through the sharing of data, such as images captured by the wearable apparatus. Accordingly, there is a need for systems and methods for providing updates to the functionality of wearable apparatuses without disclosing personal or private information of the users.

SUMMARY

Embodiments consistent with the present disclosure provide systems and methods for determining and distributing an update to an inference model for wearable apparatuses. In particular, consistent with the disclosed embodiments, the disclosed systems and methods may determine the update to the interface model in a manner that preserves the privacy of users of the wearable apparatuses.

In accordance with a disclosed embodiment, a server-based system is provided for determining a global update to an inference model and distributing the global update to a plurality of wearable apparatuses. The system includes a data interface and at least one processing device. The at least one processing device is programmed to receive, via the data interface and from a first one of the plurality of wearable apparatuses, first update information associated with the inference model. The first update information includes a first direction of a portion of a first gradient derived from one or more images captured by a camera present on the first wearable apparatus. The at least one processing device is further programmed to receive, via the data interface and from a second one of the plurality of wearable apparatuses, second update information associated with the inference model. The second update information includes a second direction of a portion of a second gradient derived from one or more images captured by a camera present on the second wearable apparatus. The at least one processing device is further programmed to analyze the first update information and the second update information to determine the global update to the inference model, and transmit, via the data interface, the global update to the plurality of wearable apparatuses.

In accordance with another disclosed embodiment, a computer-implemented method is provided for determining a global update to an inference model and distributing the global update to a plurality of wearable apparatuses. The method includes receiving, via a data interface of a server and from a first one of the plurality of wearable apparatuses, first update information associated with the inference model. The first update information includes a first direction of a portion of a first gradient derived from one or more images captured by a camera present on the first wearable apparatus. The method further includes receiving, via the data interface of the server and from a second one of the plurality of wearable apparatuses, second update associated with the inference model. The second update information includes a second direction of a portion of a second gradient derived from one or more images captured by a camera present on the second wearable apparatus. The method further includes analyzing, via at least one processing device, the first update information and the second update information to determine the global update to the inference model, and transmitting, via the data interface of the server, the global update to the plurality of wearable apparatuses.

Consistent with other disclosed embodiments, non-transitory computer-readable storage media may store program instructions, which are executed by at least one processing device and perform any of the methods described herein. Such non-transitory computer-readable storage media may be provided in the form of a software product.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings:

FIG. 2 is a schematic illustration of an example system consistent with the disclosed embodiments.

FIG. 3B is an exploded view of the example of the wearable apparatus shown in FIG. 3A.

FIG. 4A is a schematic illustration of an example of the wearable apparatus shown in FIG. 1B from a first viewpoint.

FIG. 4B is a schematic illustration of the example of the wearable apparatus shown in FIG. 1B from a second viewpoint.

FIG. 5B is a block diagram illustrating an example of the components of a wearable apparatus according to a second embodiment.

DETAILED DESCRIPTION

Figure 1A:
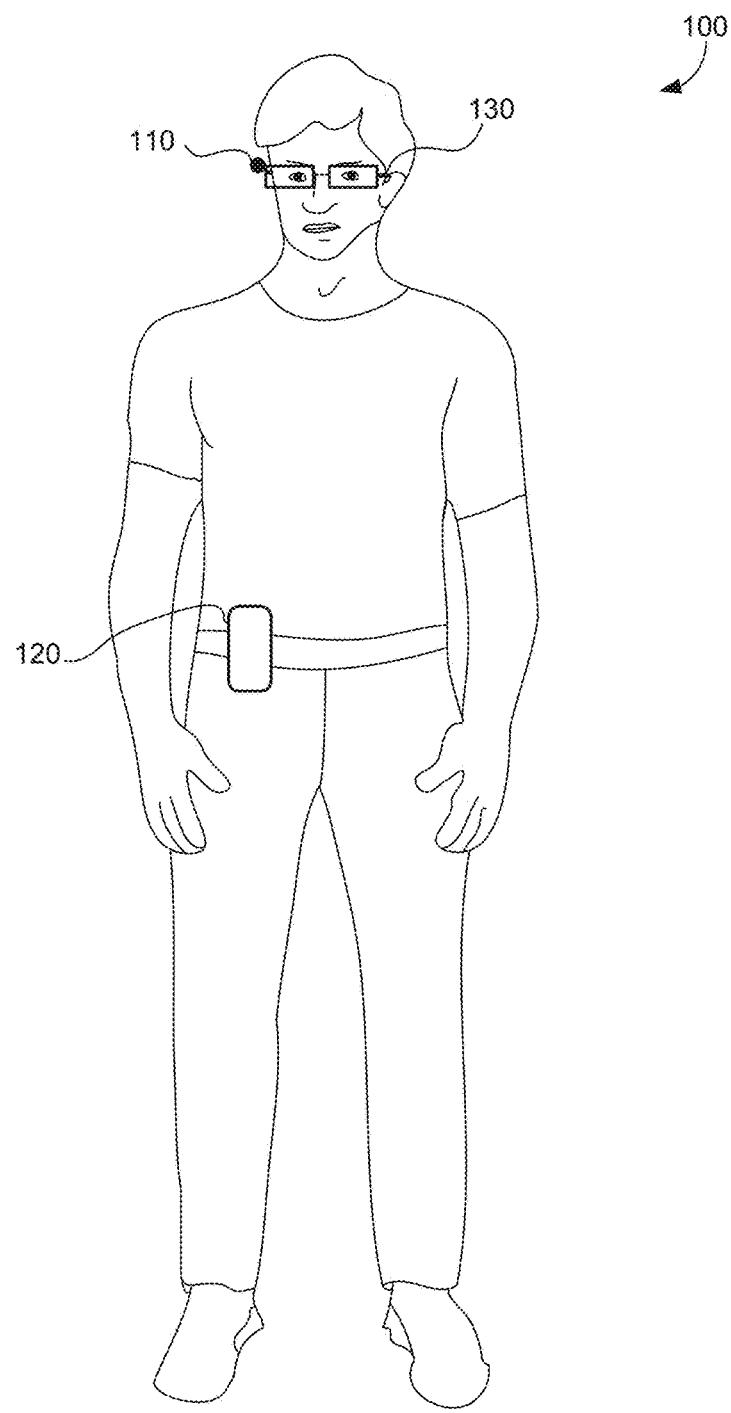
FIG. 1A is a schematic illustration of an example of a user wearing a wearable apparatus according to a disclosed embodiment.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

FIG. 1A illustrates a user 100 wearing an apparatus 110 (e.g., a wearable device) that is physically connected (or integral) to glasses 130, consistent with the disclosed embodiments. Glasses 130 may be prescription glasses, magnifying glasses, non-prescription glasses, safety glasses, sunglasses, etc. Additionally, in some embodiments, glasses 130 may include parts of a frame and earpieces, nosepieces, etc., and one or no lenses. Thus, in some embodiments, glasses 130 may function primarily to support apparatus 110, and/or an augmented reality display device or other optical display device. In some embodiments, apparatus 110 may include an image sensor (not shown in FIG. 1A) for capturing real-time image data of the field-of-view of user 100. The term "image data" includes any form of data retrieved from optical signals in the near-infrared, infrared, visible, and ultraviolet spectrums. The image data may include video clips and/or photographs.

In some embodiments, apparatus 110 may communicate wirelessly or via a wire with a computing device 120. In some embodiments, computing device 120 may include, for example, a smartphone, or a tablet, or a dedicated processing unit, which may be portable (e.g., can be carried in a pocket of user 100). Although shown in FIG. 1A as an external device, in some embodiments, computing device 120 may be provided as part of wearable apparatus 110 or glasses 130, whether integral thereto or mounted thereon. In some embodiments, computing device 120 may be included in an augmented reality display device or optical head mounted display provided integrally or mounted to glasses 130. In other embodiments, computing device 120 may be provided as part of another wearable or portable apparatus of user 100 including a wrist-strap, a multifunctional watch, a button, a clip-on, etc. And in other embodiments, computing device 120 may be provided as part of another system, such as an on-board automobile computing or navigation system. A person skilled in the art can appreciate that different types of computing devices and arrangements of devices may implement the functionality of the disclosed embodiments. Accordingly, in other implementations, computing device 120 may include a Personal Computer (PC), laptop, an Internet server, etc.

Figure 1B:
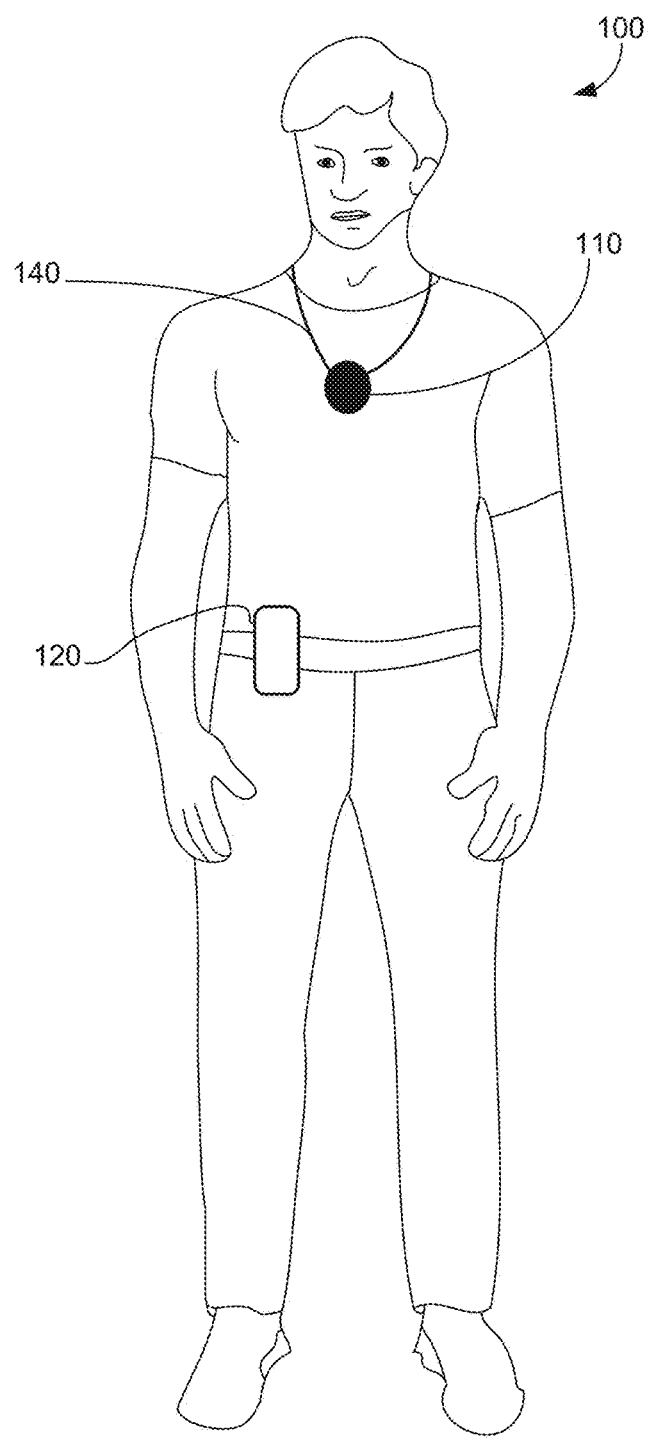
FIG. 1B is a schematic illustration of an example of the user wearing a wearable apparatus according to a disclosed embodiment.

FIG. 1B illustrates user 100 wearing apparatus 110 that is physically connected to a necklace 140, consistent with a disclosed embodiment. Such a configuration of apparatus 110 may be suitable for users that do not wear glasses some or all of the time. In this embodiment, user 100 can easily wear apparatus 110, and take it off.

Figure 1C:
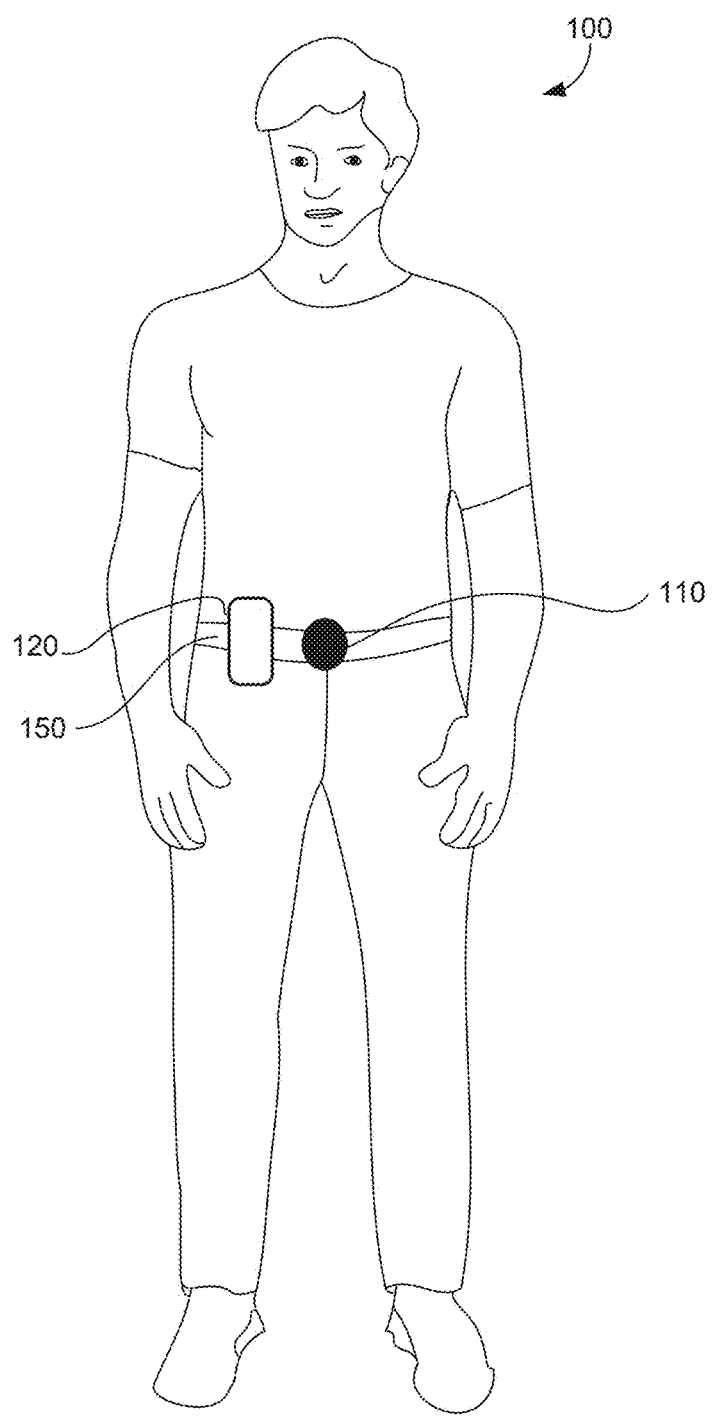
FIG. 1C is a schematic illustration of an example of the user wearing a wearable apparatus according to a disclosed embodiment.

FIG. 1C illustrates user 100 wearing apparatus 110 that is physically connected to a belt 150, consistent with a disclosed embodiment. Such a configuration of apparatus 110 may be designed as a belt buckle. Alternatively, apparatus 110 may include a clip for attaching to various clothing articles, such as belt 150, or a vest, a pocket, a collar, a cap or hat or other portion of a clothing article.

Figure 1D:
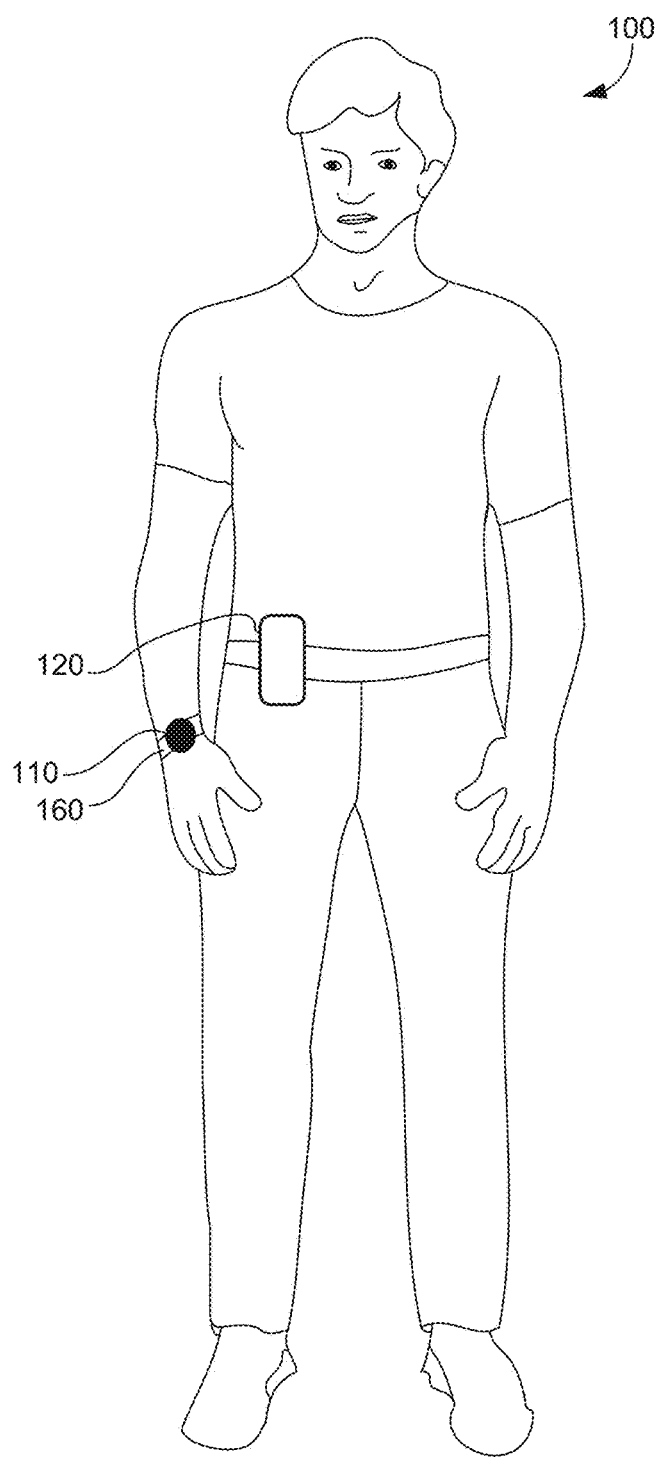
FIG. 1D is a schematic illustration of an example of the user wearing a wearable apparatus according to a disclosed embodiment.

FIG. 1D illustrates user 100 wearing apparatus 110 that is physically connected to a wrist strap 160, consistent with a disclosed embodiment. Although the aiming direction of apparatus 110, according to this embodiment, may not match the field-of-view of user 100, apparatus 110 may include the ability to identify a hand-related trigger based on the tracked eye movement of a user 100 indicating that user 100 is looking in the direction of the wrist strap 160. Wrist strap 160 may also include an accelerometer, a gyroscope, or other sensor for determining movement or orientation of a user's 100 hand for identifying a hand-related trigger.

FIG. 2 is a schematic illustration of an exemplary system 200 including a wearable apparatus 110, worn by user 100, and an optional computing device 120 and/or a server 250 capable of communicating with apparatus 110 via a network 240, consistent with disclosed embodiments. In some embodiments, apparatus 110 may capture and analyze image data, identify a hand-related trigger present in the image data, and perform an action and/or provide feedback to a user 100, based at least in part on the identification of the hand-related trigger. In some embodiments, optional computing device 120 and/or server 250 may provide additional functionality to enhance interactions of user 100 with his or her environment, as described in greater detail below, such as providing feedback regarding objects, persons, and places encountered by the users. Furthermore, although FIG. 2 depicts one apparatus 110 and one computing device 120 paired with apparatus 110, one of ordinary skill in the art will recognize that system 200 may include a plurality of wearable apparatuses, each being paired with an optional computing device.

According to the disclosed embodiments, apparatus 110 may include an image sensor system 220 for capturing real-time image data of the field-of-view of user 100. In some embodiments, apparatus 110 may also include a processing unit 210 for controlling and performing the disclosed functionality of apparatus 110, such as to control the capture of image data, analyze the image data, and perform an action and/or output a feedback based on a hand-related trigger identified in the image data. According to the disclosed embodiments, a hand-related trigger may include a gesture performed by user 100 involving a portion of a hand of user 100. Further, consistent with some embodiments, a hand-related trigger may include a wrist-related trigger. Additionally, in some embodiments, apparatus 110 may include a feedback outputting unit 230 for producing an output of information to user 100.

As discussed above, apparatus 110 may include an image sensor 220 for capturing image data. The term "image sensor" refers to a device capable of detecting and converting optical signals in the near-infrared, infrared, visible, and ultraviolet spectrums into electrical signals. The electrical signals may be used to form an image or a video stream (i.e. image data) based on the detected signal. The term "image data" includes any form of data retrieved from optical signals in the near-infrared, infrared, visible, and ultraviolet spectrums. Examples of image sensors may include semiconductor charge-coupled devices (CCD), active pixel sensors in complementary metal-oxide-semiconductor (CMOS), or N-type metal-oxide-semiconductor (NMOS, Live MOS). In some cases, image sensor 220 may be part of a camera included in apparatus 110.

Apparatus 110 may also include a processor 210 for controlling image sensor 220 to capture image data and for analyzing the image data according to the disclosed embodiments. As discussed in further detail below with respect to FIG. 5A, processor 210 may include a "processing device" for performing logic operations on one or more inputs of image data and other data according to stored or accessible software instructions providing desired functionality. In some embodiments, processor 210 may also control feedback outputting unit 230 to provide feedback to user 100 including information based on the analyzed image data and the stored software instructions. As the term is used herein, a "processing device" may access memory where executable instructions are stored or, in some embodiments, a "processing device" itself may include executable instructions (e.g., stored in memory included in the processing device).

In some embodiments, the information or feedback information provided to user 100 may include time information. The time information may include any information related to a current time of day and, as described further below, may be presented in any sensory perceptive manner. In some embodiments, time information may include a current time of day in a preconfigured format (e.g., 2:30 pm or 14:30). Time information may include the time in the user's current time zone (e.g., based on a determined location of user 100), as well as an indication of the time zone and/or a time of day in another desired location. In some embodiments, time information may include a number of hours or minutes relative to one or more predetermined times of day. For example, in some embodiments, time information may include an indication that three hours and fifteen minutes remain until a particular hour (e.g., until 6:00 pm), or some other predetermined time. Time information may also include a duration of time passed since the beginning of a particular activity, such as the start of a meeting or the start of a jog, or any other activity. In some embodiments, the activity may be determined based on analyzed image data. In other embodiments, time information may also include additional information related to a current time and one or more other routine, periodic, or scheduled events. For example, time information may include an indication of the number of minutes remaining until the next scheduled event, as may be determined from a calendar function or other information retrieved from computing device 120 or server 250, as discussed in further detail below.

Feedback outputting unit 230 may include one or more feedback systems for providing the output of information to user 100. In the disclosed embodiments, the audible or visual feedback may be provided via any type of connected audible or visual system or both. Feedback of information according to the disclosed embodiments may include audible feedback to user 100 (e.g., using a Bluetooth™ or other wired or wirelessly connected speaker, or a bone conduction headphone). Feedback outputting unit 230 of some embodiments may additionally or alternatively produce a visible output of information to user 100, for example, as part of an augmented reality display projected onto a lens of glasses 130 or provided via a separate heads up display in communication with apparatus 110, such as a display 260 provided as part of computing device 120, which may include an onboard automobile heads up display, an augmented reality device, a virtual reality device, a smartphone, PC, table, etc.

The term "computing device" refers to a device including a processing unit and having computing capabilities. Some examples of computing device 120 include a PC, laptop, tablet, or other computing systems such as an on-board computing system of an automobile, for example, each configured to communicate directly with apparatus 110 or server 250 over network 240. Another example of computing device 120 includes a smartphone having a display 260. In some embodiments, computing device 120 may be a computing system configured particularly for apparatus 110, and may be provided integral to apparatus 110 or tethered thereto. Apparatus 110 can also connect to computing device 120 over network 240 via any known wireless standard (e.g., Wi-Fi, Bluetooth®, etc.), as well as near-filed capacitive coupling, and other short range wireless techniques, or via a wired connection. In an embodiment in which computing device 120 is a smartphone, computing device 120 may have a dedicated application installed therein. For example, user 100 may view on display 260 data (e.g., images, video clips, extracted information, feedback information, etc.) that originate from or are triggered by apparatus 110. In addition, user 100 may select part of the data for storage in server 250.

Network 240 may be a shared, public, or private network, may encompass a wide area or local area, and may be implemented through any suitable combination of wired and/or wireless communication networks. Network 240 may further comprise an intranet or the Internet. In some embodiments, network 240 may include short range or near-field wireless communication systems for enabling communication between apparatus 110 and computing device 120 provided in close proximity to each other, such as on or near a user's person, for example. Apparatus 110 may establish a connection to network 240 autonomously, for example, using a wireless module (e.g., Wi-Fi, cellular). In some embodiments, apparatus 110 may use the wireless module when being connected to an external power source, to prolong battery life. Further, communication between apparatus 110 and server 250 may be accomplished through any suitable communication channels, such as, for example, a telephone network, an extranet, an intranet, the Internet, satellite communications, off-line communications, wireless communications, transponder communications, a local area network (LAN), a wide area network (WAN), and a virtual private network (VPN).

As shown in FIG. 2, apparatus 110 may transfer or receive data to/from server 250 via network 240. In the disclosed embodiments, the data being received from server 250 and/or computing device 120 may include numerous different types of information based on the analyzed image data, including information related to a commercial product, or a person's identity, an identified landmark, and any other information capable of being stored in or accessed by server 250. In some of the disclosed embodiments, the data received from server 250 and/or computing device may include update information for an inference model, as discussed in more detail below. In some embodiments, data may be received and transferred via computing device 120. Server 250 and/or computing device 120 may retrieve information from different data sources (e.g., a user specific database or a user's social network account or other account, the Internet, and other managed or accessible databases) and provide information to apparatus 110 related to the analyzed image data and a recognized trigger according to the disclosed embodiments. In some embodiments, calendar-related information retrieved from the different data sources may be analyzed to provide certain time information or a time-based context for providing certain information based on the analyzed image data.

Server 250 may include a data interface and at least one processing device. A "data interface" includes any hardware and/or software installed for transferring or receiving data. The term "processing device" includes any physical device having an electric circuit that performs a logic operation on input or inputs. For example, a processing device may include one or more integrated circuits, microchips, microcontrollers, microprocessors, all or part of a central processing unit (CPU), graphics processing unit (GPU), digital signal processor (DSP), field-programmable gate array (FPGA), or other circuits suitable for executing instructions or performing logic operations. In some embodiments, the processing device may be configured to process update information associated with an inference model and received from a wearable apparatus, as discussed below in further detail.

Figure 3A:
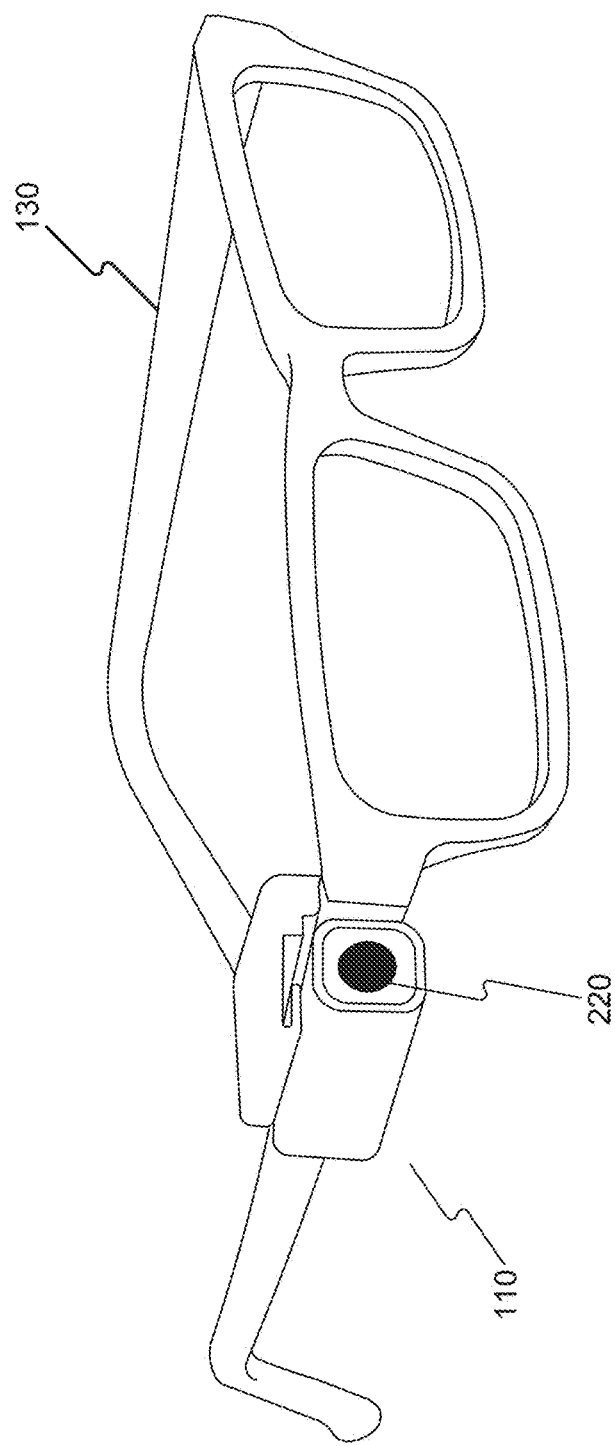
FIG. 3A is a schematic illustration of an example of the wearable apparatus shown in FIG. 1A.

An example of wearable apparatus 110 incorporated with glasses 130 according to some embodiments (as discussed in connection with FIG. 1A) is shown in greater detail in FIG. 3A. In some embodiments, apparatus 110 may be associated with a structure (not shown in FIG. 3A) that enables easy detaching and reattaching of apparatus 110 to glasses 130. In some embodiments, when apparatus 110 attaches to glasses 130, image sensor 220 acquires a set aiming direction without the need for directional calibration. The set aiming direction of image sensor 220 may substantially coincide with the field-of-view of user 100. For example, a camera associated with image sensor 220 may be installed within apparatus 110 in a predetermined angle in a position facing slightly downwards (e.g., 5-15 degrees from the horizon). Accordingly, the set aiming direction of image sensor 220 may substantially match the field-of-view of user 100.

FIG. 3B is an exploded view of the components of the embodiment discussed regarding FIG. 3A. Attaching apparatus 110 to glasses 130 may take place in the following way. Initially, a support 310 may be mounted on glasses 130 using a screw 320, in the side of support 310. Then, apparatus 110 may be clipped on support 310 such that it is aligned with the field-of-view of user 100. The term "support" includes any device or structure that enables detaching and reattaching of a device including a camera to a pair of glasses or to another object (e.g., a helmet). Support 310 may be made from plastic (e.g., polycarbonate), metal (e.g., aluminum), or a combination of plastic and metal (e.g., carbon fiber graphite). Support 310 may be mounted on any kind of glasses (e.g., eyeglasses, sunglasses, 3D glasses, safety glasses, etc.) using screws, bolts, snaps, or any fastening means used in the art.

In some embodiments, support 310 may include a quick release mechanism for disengaging and reengaging apparatus 110. For example, support 310 and apparatus 110 may include magnetic elements. As an alternative example, support 310 may include a male latch member and apparatus 110 may include a female receptacle. In other embodiments, support 310 can be an integral part of a pair of glasses, or sold separately and installed by an optometrist. For example, support 310 may be configured for mounting on the arms of glasses 130 near the frame front, but before the hinge. Alternatively, support 310 may be configured for mounting on the bridge of glasses 130.

In some embodiments, apparatus 110 may be provided as part of a glasses frame 130, with or without lenses. Additionally, in some embodiments, apparatus 110 may be configured to provide an augmented reality display projected onto a lens of glasses 130 (if provided), or alternatively, may include a display for projecting time information, for example, according to the disclosed embodiments. Apparatus 110 may include the additional display or alternatively, may be in communication with a separately provided display system that may or may not be attached to glasses 130.

In some embodiments, apparatus 110 may be implemented in a form other than wearable glasses, as described above with respect to FIGS. 1B-1D, for example. FIG. 4A is a schematic illustration of an example of an additional embodiment of apparatus 110 from a first viewpoint. The viewpoint shown in FIG. 4A is from the front of apparatus 110. Apparatus 110 includes an image sensor 220, a clip (not shown), a function button (not shown) and a hanging ring 410 for attaching apparatus 110 to, for example, necklace 140, as shown in FIG. 1B. When apparatus 110 hangs on necklace 140, the aiming direction of image sensor 220 may not fully coincide with the field-of-view of user 100, but the aiming direction would still correlate with the field-of-view of user 100.

FIG. 4B is a schematic illustration of the example of a second embodiment of apparatus 110, from a second viewpoint. The viewpoint shown in FIG. 4B is from a side orientation of apparatus 110. In addition to hanging ring 410, as shown in FIG. 4B, apparatus 110 may further include a clip 420. User 100 can use clip 420 to attach apparatus 110 to a shirt or belt 150, as illustrated in FIG. 1C. Clip 420 may provide an easy mechanism for disengaging and reengaging apparatus 110 from different articles of clothing. In other embodiments, apparatus 110 may include a female receptacle for connecting with a male latch of a car mount or universal stand.

In some embodiments, apparatus 110 includes a function button 430 for enabling user 100 to provide input to apparatus 110. Function button 430 may accept different types of tactile input (e.g., a tap, a click, a double-click, a long press, a right-to-left slide, a left-to-right slide). In some embodiments, each type of input may be associated with a different action. For example, a tap may be associated with the function of taking a picture, while a right-to-left slide may be associated with the function of recording a video.

The example embodiments discussed above with respect to FIGS. 3A, 3B, 4A, and 4B are not limiting. In some embodiments, apparatus 110 may be implemented in any suitable configuration for performing the disclosed methods. For example, referring back to FIG. 2, the disclosed embodiments may implement an apparatus 110 according to any configuration including an image sensor 220 and a processor unit 210 to perform image analysis and for communicating with a feedback unit 230.

Figure 5A:
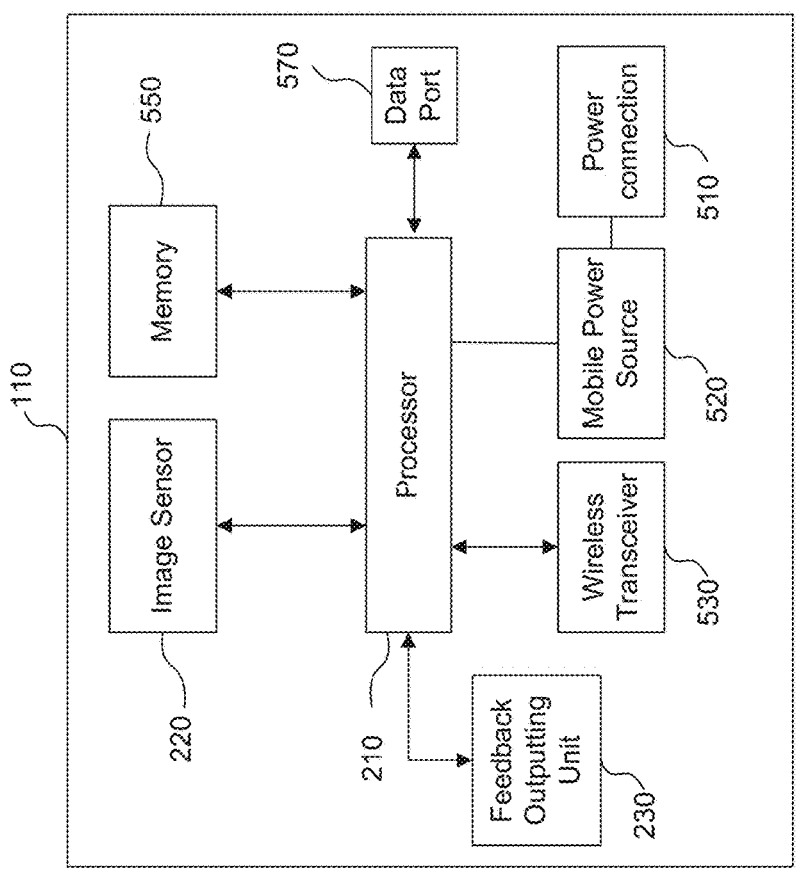
FIG. 5A is a block diagram illustrating an example of the components of a wearable apparatus according to a first embodiment.

FIG. 5A is a block diagram illustrating the components of apparatus 110 according to an example embodiment. As shown in FIG. 5A, and as similarly discussed above, apparatus 110 includes an image sensor 220, a memory 550, a processor 210, a feedback outputting unit 230, a wireless transceiver 530, and a mobile power source 520. In other embodiments, apparatus 110 may also include buttons, other sensors such as a microphone, and inertial measurements devices such as accelerometers, gyroscopes, magnetometers, temperature sensors, color sensors, light sensors, etc. Apparatus 110 may further include a data port 570 and a power connection 510 with suitable interfaces for connecting with an external power source or an external device (not shown).

Processor 210, depicted in FIG. 5A, may include any suitable processing device. The term "processing device" includes any physical device having an electric circuit that performs a logic operation on input or inputs. For example, a processing device may include one or more integrated circuits, microchips, microcontrollers, microprocessors, all or part of a central processing unit (CPU), graphics processing unit (GPU), digital signal processor (DSP), field-programmable gate array (FPGA), or other circuits suitable for executing instructions or performing logic operations. The instructions executed by the processing device may, for example, be pre-loaded into a memory integrated with or embedded into the processing device or may be stored in a separate memory (e.g., memory 550). Memory 550 may comprise a Random Access Memory (RAM), a Read-Only Memory (ROM), a hard disk, an optical disk, a magnetic medium, a flash memory, other permanent, fixed, or volatile memory, or any other mechanism capable of storing instructions.

Although, in the embodiment illustrated in FIG. 5A, apparatus 110 includes one processing device (e.g., processor 210), apparatus 110 may include more than one processing device. Each processing device may have a similar construction, or the processing devices may be of differing constructions that are electrically connected or disconnected from each other. For example, the processing devices may be separate circuits or integrated in a single circuit. When more than one processing device is used, the processing devices may be configured to operate independently or collaboratively. The processing devices may be coupled electrically, magnetically, optically, acoustically, mechanically or by other means that permit them to interact.

In some embodiments, processor 210 may process a plurality of images captured from the environment of user 100 to determine different parameters related to capturing subsequent images. For example, processor 210 can determine, based on information derived from captured image data, a value for at least one of the following: an image resolution, a compression ratio, a cropping parameter, frame rate, a focus point, an exposure time, an aperture size, and a light sensitivity. The determined value may be used in capturing at least one subsequent image. Additionally, processor 210 can detect images including at least one hand-related trigger in the environment of the user and perform an action and/or provide an output of information to a user via feedback outputting unit 230.

In another embodiment, processor 210 can change the aiming direction of image sensor 220. For example, when apparatus 110 is attached with clip 420, the aiming direction of image sensor 220 may not coincide with the field-of-view of user 100. Processor 210 may recognize certain situations from the analyzed image data and adjust the aiming direction of image sensor 220 to capture relevant image data. For example, in one embodiment, processor 210 may detect an interaction with another individual and sense that the individual is not fully in view, because image sensor 220 is tilted down. Responsive thereto, processor 210 may adjust the aiming direction of image sensor 220 to capture image data of the individual. Other scenarios are also contemplated where processor 210 may recognize the need to adjust an aiming direction of image sensor 220.

In some embodiments, processor 210 may communicate data to feedback-outputting unit 230, which may include any device configured to provide information to a user 100. Feedback outputting unit 230 may be provided as part of apparatus 110 (as shown) or may be provided external to apparatus 110 and communicatively coupled thereto. Feedback-outputting unit 230 may be configured to output visual or nonvisual feedback based on signals received from processor 210, such as when processor 210 recognizes a hand-related trigger in the analyzed image data.

The term "feedback" refers to any output or information provided in response to processing at least one image in an environment. In some embodiments, as similarly described above, feedback may include an audible or visible indication of time information, detected text or numerals, the value of currency, a branded product, a person's identity, the identity of a landmark or other environmental situation or condition including the street names at an intersection or the color of a traffic light, etc., as well as other information associated with each of these. For example, in some embodiments, feedback may include additional information regarding the amount of currency still needed to complete a transaction, information regarding the identified person, historical information or times and prices of admission etc. of a detected landmark etc. In some embodiments, feedback may include an audible tone, a tactile response, and/or information previously recorded by user 100. Feedback-outputting unit 230 may comprise appropriate components for outputting acoustical and tactile feedback. For example, feedback-outputting unit 230 may comprise audio headphones, a hearing aid type device, a speaker, a bone conduction headphone, interfaces that provide tactile cues, vibrotactile stimulators, etc. In some embodiments, processor 210 may communicate signals with an external feedback outputting unit 230 via a wireless transceiver 530, a wired connection, or some other communication interface. In some embodiments, feedback outputting unit 230 may also include any suitable display device for visually displaying information to user 100.

As shown in FIG. 5A, apparatus 110 includes memory 550. Memory 550 may include one or more sets of instructions accessible to processor 210 to perform the disclosed methods, including instructions for recognizing a hand-related trigger in the image data. In some embodiments memory 550 may store image data (e.g., images, videos) captured from the environment of user 100. In addition, memory 550 may store information specific to user 100, such as image representations of known individuals, favorite products, personal items, and calendar or appointment information, etc. In some embodiments, processor 210 may determine, for example, which type of image data to store based on available storage space in memory 550. In another embodiment, processor 210 may extract information from the image data stored in memory 550.

As further shown in FIG. 5A, apparatus 110 includes mobile power source 520. The term "mobile power source" includes any device capable of providing electrical power, which can be easily carried by hand (e.g., mobile power source 520 may weigh less than a pound). The mobility of the power source enables user 100 to use apparatus 110 in a variety of situations. In some embodiments, mobile power source 520 may include one or more batteries (e.g., nickel-cadmium batteries, nickel-metal hydride batteries, and lithium-ion batteries) or any other type of electrical power supply. In other embodiments, mobile power source 520 may be rechargeable and contained within a casing that holds apparatus 110. In yet other embodiments, mobile power source 520 may include one or more energy harvesting devices for converting ambient energy into electrical energy (e.g., portable solar power units, human vibration units, etc.).

Mobile power source 520 may power one or more wireless transceivers (e.g., wireless transceiver 530 in FIG. 5A). The term "wireless transceiver" refers to any device configured to exchange transmissions over an air interface by use of radio frequency, infrared frequency, magnetic field, or electric field. Wireless transceiver 530 may use any known standard to transmit and/or receive data (e.g., Wi-Fi, Bluetooth®, Bluetooth Smart, 802.15.4, or ZigBee). In some embodiments, wireless transceiver 530 may transmit data (e.g., raw image data, processed image data, extracted information) from apparatus 110 to computing device 120 and/or server 250. Wireless transceiver 530 may also receive data from computing device 120 and/or server 250. In other embodiments, wireless transceiver 530 may transmit data and instructions to an external feedback outputting unit 230.

FIG. 5B is a block diagram illustrating the components of apparatus 110 according to another example embodiment. In some embodiments, apparatus 110 includes a first image sensor 220a, a second image sensor 220b, a memory 550, a first processor 210a, a second processor 210b, a feedback outputting unit 230, a wireless transceiver 530, a mobile power source 520, and a power connector 510. In the arrangement shown in FIG. 5B, each of the image sensors may provide images in a different image resolution, or face a different direction. Alternatively, each image sensor may be associated with a different camera (e.g., a wide angle camera, a narrow angle camera, an IR camera, etc.). In some embodiments, apparatus 110 can select which image sensor to use based on various factors. For example, processor 210a may determine, based on available storage space in memory 550, to capture subsequent images in a certain resolution.

Apparatus 110 may operate in a first processing-mode and in a second processing-mode, such that the first processing-mode may consume less power than the second processing-mode. For example, in the first processing-mode, apparatus 110 may capture images and process the captured images to make real-time decisions based on an identifying hand-related trigger, for example. In the second processing-mode, apparatus 110 may extract information from stored images in memory 550 and delete images from memory 550. In some embodiments, mobile power source 520 may provide more than fifteen hours of processing in the first processing-mode and about three hours of processing in the second processing-mode. Accordingly, different processing-modes may allow mobile power source 520 to produce sufficient power for powering apparatus 110 for various time periods (e.g., more than two hours, more than four hours, more than ten hours, etc.).

In some embodiments, apparatus 110 may use first processor 210a in the first processing-mode when powered by mobile power source 520, and second processor 210b in the second processing-mode when powered by external power source 580 that is connectable via power connector 510. In other embodiments, apparatus 110 may determine, based on predefined conditions, which processors or which processing modes to use. Apparatus 110 may operate in the second processing-mode even when apparatus 110 is not powered by external power source 580. For example, apparatus 110 may determine that it should operate in the second processing-mode when apparatus 110 is not powered by external power source 580, if the available storage space in memory 550 for storing new image data is lower than a predefined threshold.

Although one wireless transceiver is depicted in FIG. 5B, apparatus 110 may include more than one wireless transceiver (e.g., two wireless transceivers). In an arrangement with more than one wireless transceiver, each of the wireless transceivers may use a different standard to transmit and/or receive data. In some embodiments, a first wireless transceiver may communicate with server 250 or computing device 120 using a cellular standard (e.g., LTE or GSM), and a second wireless transceiver may communicate with server 250 or computing device 120 using a short-range standard (e.g., Wi-Fi or Bluetooth®). In some embodiments, apparatus 110 may use the first wireless transceiver when the wearable apparatus is powered by a mobile power source included in the wearable apparatus, and use the second wireless transceiver when the wearable apparatus is powered by an external power source.

Figure 5C:
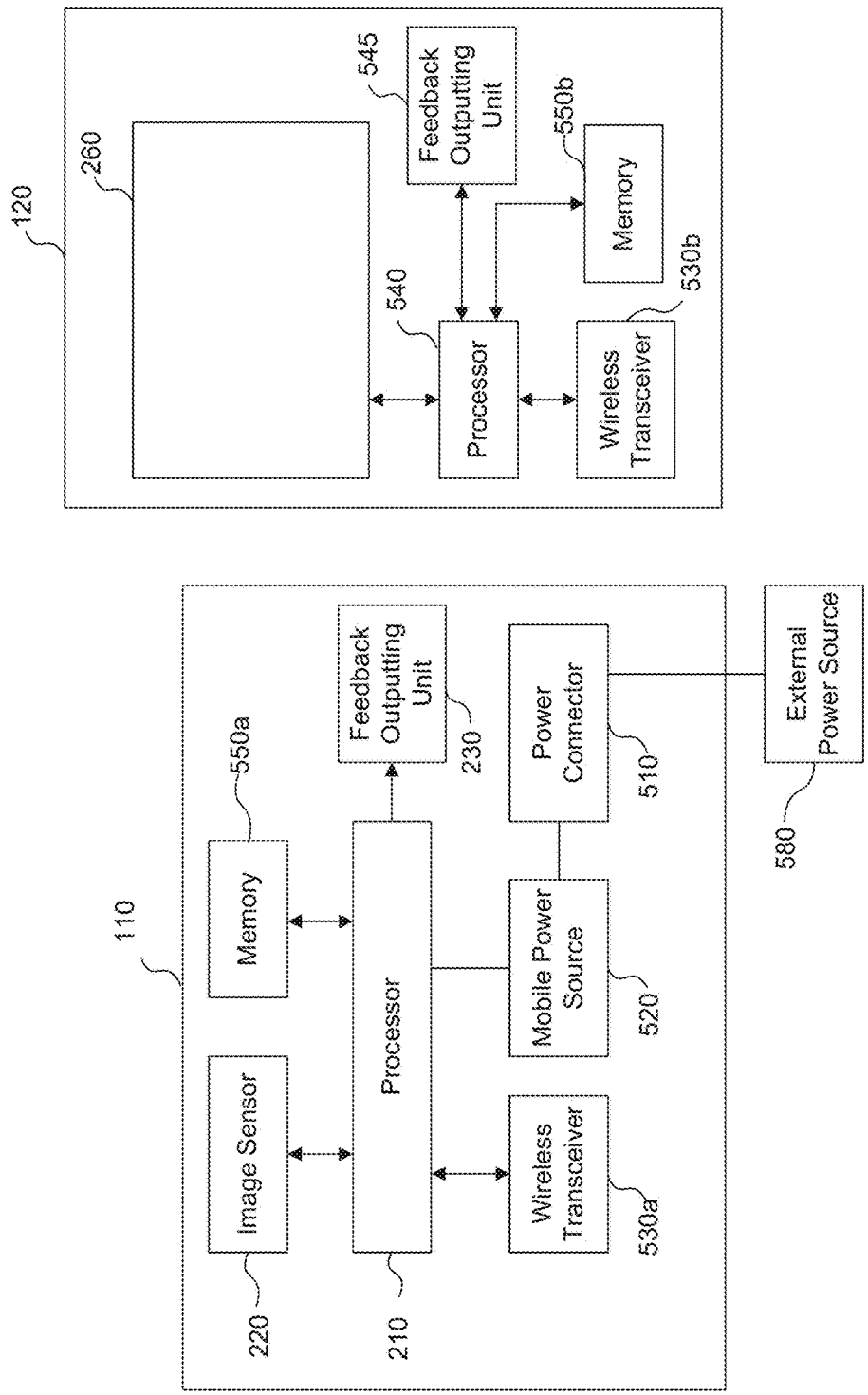
FIG. 5C is a block diagram illustrating an example of the components of a wearable apparatus according to a third embodiment.

FIG. 5C is a block diagram illustrating the components of apparatus 110 according to another example embodiment including computing device 120. In this embodiment, apparatus 110 includes an image sensor 220, a memory 550a, a first processor 210, a feedback-outputting unit 230, a wireless transceiver 530a, a mobile power source 520, and a power connector 510. As further shown in FIG. 5C, computing device 120 includes a processor 540, a feedback-outputting unit 545, a memory 550b, a wireless transceiver 530b, and a display 260. One example of computing device 120 is a smartphone or tablet having a dedicated application installed therein. In other embodiments, computing device 120 may include any configuration such as an on-board automobile computing system, a PC, a laptop, and any other system consistent with the disclosed embodiments. In this example, user 100 may view feedback output in response to identification of a hand-related trigger on display 260. Additionally, user 100 may view other data (e.g., images, video clips, object information, schedule information, extracted information, etc.) on display 260. In addition, user 100 may communicate with server 250 via computing device 120.

In some embodiments, processor 210 and processor 540 are configured to extract information from captured image data. The term "extracting information" includes any process by which information associated with objects, individuals, locations, events, etc., is identified in the captured image data by any means known to those of ordinary skill in the art. In some embodiments, apparatus 110 may use the extracted information to send feedback or other real-time indications to feedback outputting unit 230 or to computing device 120. In some embodiments, processor 210 may identify in the image data the individual standing in front of user 100, and send computing device 120 the name of the individual and the last time user 100 met the individual. In another embodiment, processor 210 may identify in the image data, one or more visible triggers, including a hand-related trigger, and determine whether the trigger is associated with a person other than the user of the wearable apparatus to selectively determine whether to perform an action associated with the trigger. One such action may be to provide a feedback to user 100 via feedback-outputting unit 230 provided as part of (or in communication with) apparatus 110 or via a feedback unit 545 provided as part of computing device 120. For example, feedback-outputting unit 545 may be in communication with display 260 to cause the display 260 to visibly output information. In some embodiments, processor 210 may identify in the image data a hand-related trigger and send computing device 120 an indication of the trigger. Processor 540 may then process the received trigger information and provide an output via feedback outputting unit 545 or display 260 based on the hand-related trigger. In other embodiments, processor 540 may determine a hand-related trigger and provide suitable feedback similar to the above, based on image data received from apparatus 110. In some embodiments, processor 540 may provide instructions or other information, such as environmental information to apparatus 110 based on an identified hand-related trigger.

In some embodiments, processor 210 may identify other environmental information in the analyzed images, such as an individual standing in front user 100, and send computing device 120 information related to the analyzed information such as the name of the individual and the last time user 100 met the individual. In a different embodiment, processor 540 may extract statistical information from captured image data and forward the statistical information to server 250. For example, certain information regarding the types of items a user purchases, or the frequency a user patronizes a particular merchant, etc. may be determined by processor 540. Based on this information, server 250 may send computing device 120 coupons and discounts associated with the user's preferences.

When apparatus 110 is connected or wirelessly connected to computing device 120, apparatus 110 may transmit at least part of the image data stored in memory 550a for storage in memory 550b. In some embodiments, after computing device 120 confirms that transferring the part of image data was successful, processor 540 may delete the part of the image data. The term "delete" means that the image is marked as 'deleted' and other image data may be stored instead of it, but does not necessarily mean that the image data was physically removed from the memory.

As will be appreciated by a person skilled in the art having the benefit of this disclosure, numerous variations and/or modifications may be made to the disclosed embodiments. Not all components are essential for the operation of apparatus 110. Any component may be located in any appropriate apparatus and the components may be rearranged into a variety of configurations while providing the functionality of the disclosed embodiments. For example, in some embodiments, apparatus 110 may include a camera, a processor, and a wireless transceiver for sending data to another device. Therefore, the foregoing configurations are examples and, regardless of the configurations discussed above, apparatus 110 can capture, store, and/or process images.

Further, the foregoing and following description refers to storing and/or processing images or image data. In the embodiments disclosed herein, the stored and/or processed images or image data may comprise a representation of one or more images captured by image sensor 220. As the term is used herein, a "representation" of an image (or image data) may include an entire image or a portion of an image. A representation of an image (or image data) may have the same resolution or a lower resolution as the image (or image data), and/or a representation of an image (or image data) may be altered in some respect (e.g., be compressed, have a lower resolution, have one or more colors that are altered, etc.).

For example, apparatus 110 may capture an image and store a representation of the image that is compressed as a .JPG file. As another example, apparatus 110 may capture an image in color, but store a black-and-white representation of the color image. As yet another example, apparatus 110 may capture an image and store a different representation of the image (e.g., a portion of the image). For example, apparatus 110 may store a portion of an image that includes a face of a person who appears in the image, but that does not substantially include the environment surrounding the person. Similarly, apparatus 110 may, for example, store a portion of an image that includes a product that appears in the image, but does not substantially include the environment surrounding the product. As yet another example, apparatus 110 may store a representation of an image at a reduced resolution (i.e., at a resolution that is of a lower value than that of the captured image). Storing representations of images may allow apparatus 110 to save storage space in memory 550. Furthermore, processing representations of images may allow apparatus 110 to improve processing efficiency and/or help to preserve battery life.

In addition to the above, in some embodiments, any one of apparatus 110 or computing device 120, via processor 210 or 540, may further process the captured image data to provide additional functionality to recognize objects and/or gestures and/or other information in the captured image data. In some embodiments, actions may be taken based on the identified objects, gestures, or other information. In some embodiments, processor 210 or 540 may identify in the image data, one or more visible triggers, including a hand-related trigger, and determine whether the trigger is associated with a person other than the user to determine whether to perform an action associated with the trigger.

Some embodiments of the present disclosure may include an apparatus securable to an article of clothing of a user. Such an apparatus may include two portions, connectable by a connector. A capturing unit may be designed to be worn on the outside of a user's clothing, and may include an image sensor for capturing images of a user's environment. The capturing unit may be connected to or connectable to a power unit, which may be configured to house a power source and a processing device. The capturing unit may be a small device including a camera or other device for capturing images. The capturing unit may be designed to be inconspicuous and unobtrusive, and may be configured to communicate with a power unit concealed by a user's clothing. The power unit may include bulkier aspects of the system, such as transceiver antennas, at least one battery, a processing device, etc. In some embodiments, communication between the capturing unit and the power unit may be provided by a data cable included in the connector, while in other embodiments, communication may be wirelessly achieved between the capturing unit and the power unit. Some embodiments may permit alteration of the orientation of an image sensor of the capture unit, for example to better capture images of interest.

Figure 6:
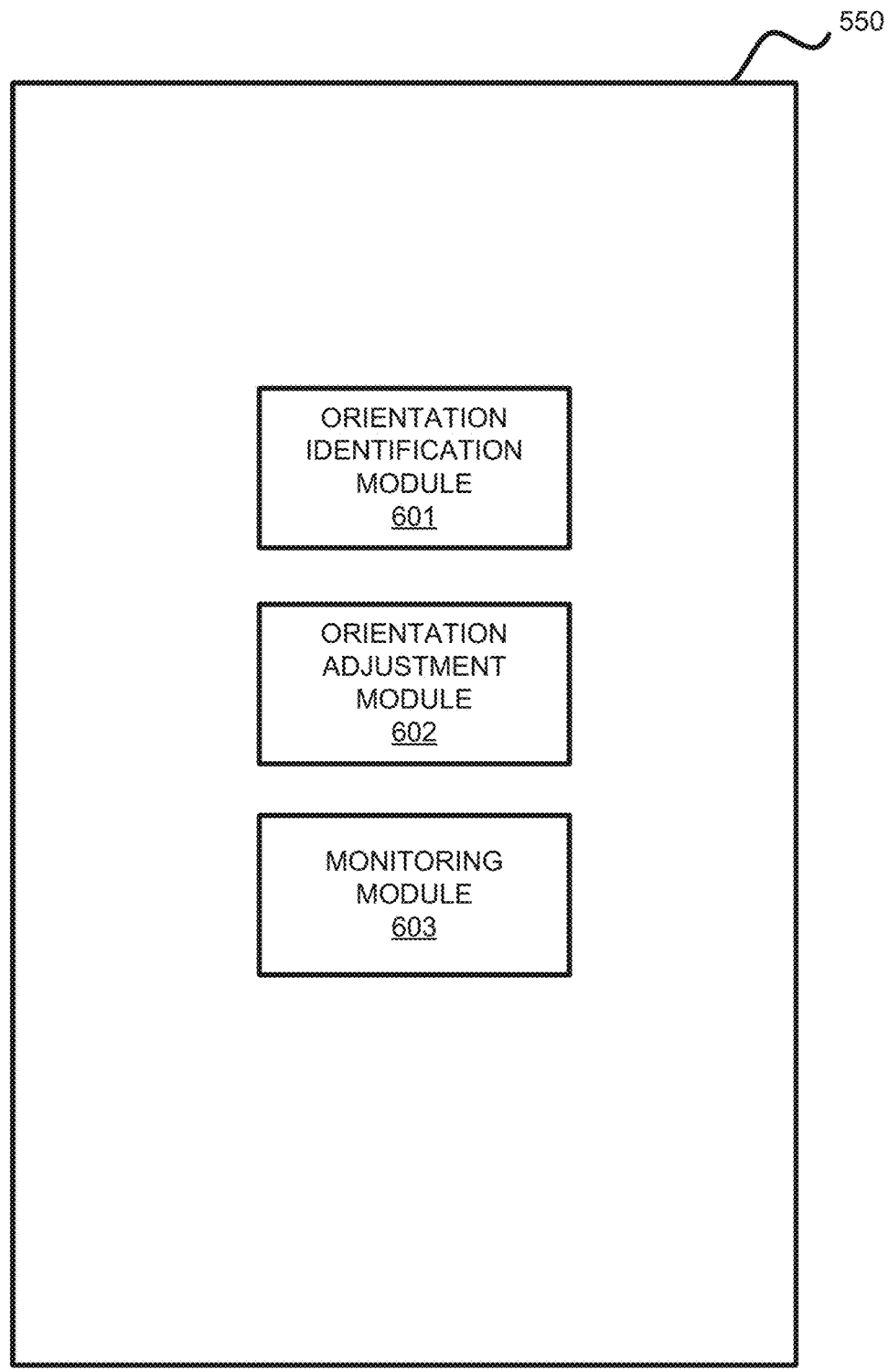
FIG. 6 illustrates an exemplary embodiment of a memory containing software modules consistent with the present disclosure.

FIG. 6 illustrates an exemplary embodiment of a memory containing software modules consistent with the present disclosure. Included in memory 550 are orientation identification module 601, orientation adjustment module 602, and motion tracking module 603. Modules 601, 602, 603 may contain software instructions for execution by at least one processing device, e.g., processor 210, included with a wearable apparatus. Orientation identification module 601, orientation adjustment module 602, and motion tracking module 603 may cooperate to provide orientation adjustment for a capturing unit incorporated into wireless apparatus 110.

Figure 7:
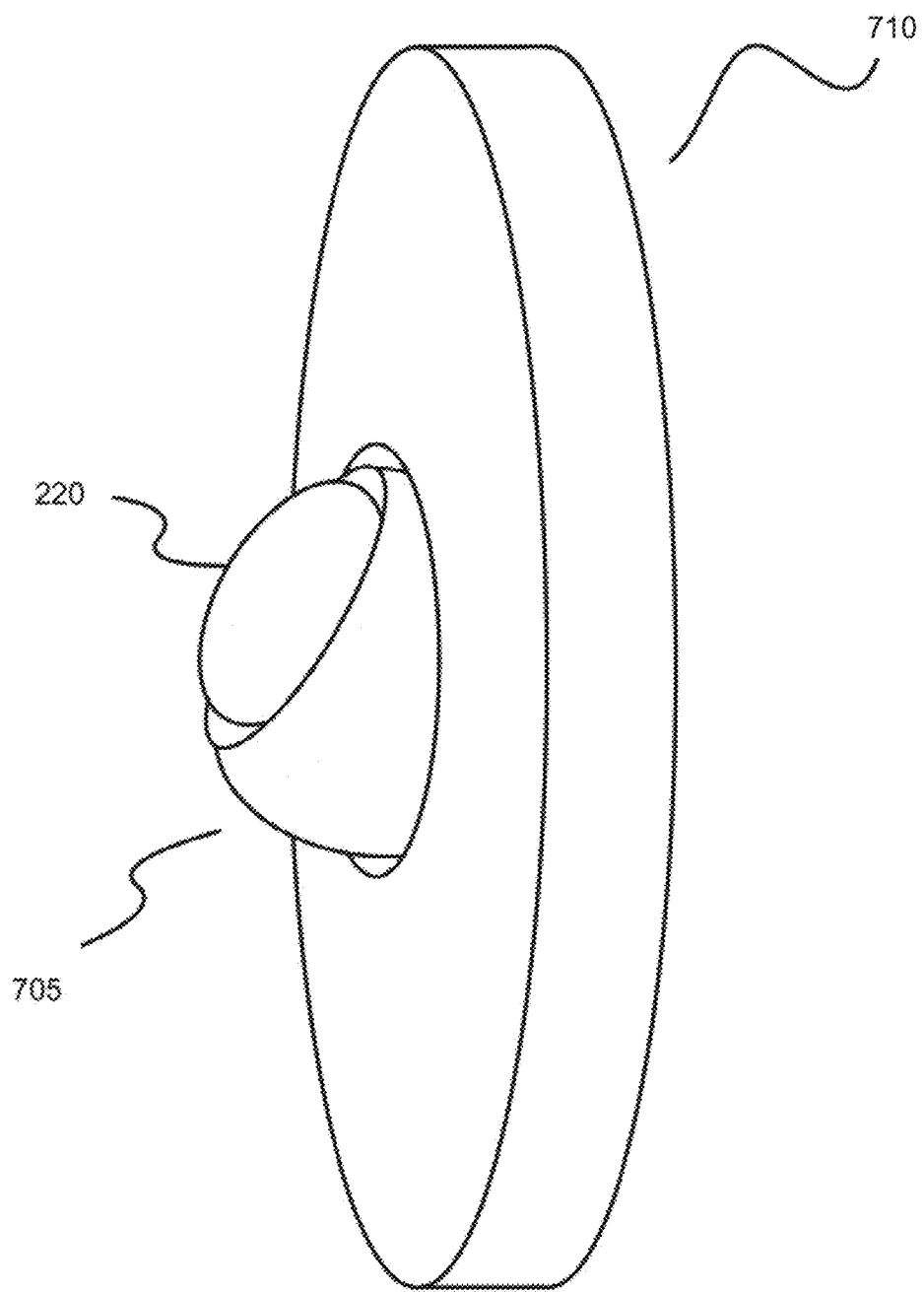
FIG. 7 is a schematic illustration of an embodiment of a wearable apparatus including an orientable image capture unit.

FIG. 7 illustrates an exemplary capturing unit 710 including an orientation adjustment unit 705. Orientation adjustment unit 705 may be configured to permit the adjustment of image sensor 220. As illustrated in FIG. 7, orientation adjustment unit 705 may include an eye-ball type adjustment mechanism. In alternative embodiments, orientation adjustment unit 705 may include gimbals, adjustable stalks, pivotable mounts, and any other suitable unit for adjusting an orientation of image sensor 220.

Image sensor 220 may be configured to be movable with the head of user 100 in such a manner that an aiming direction of image sensor 220 substantially coincides with a field of view of user 100. For example, as described above, a camera associated with image sensor 220 may be installed within capturing unit 710 at a predetermined angle in a position facing slightly upwards or downwards, depending on an intended location of capturing unit 710. Accordingly, the set aiming direction of image sensor 220 may match the field-of-view of user 100. In some embodiments, processor 210 may change the orientation of image sensor 220 using image data provided from image sensor 220. For example, processor 210 may recognize that a user is reading a book and determine that the aiming direction of image sensor 220 is offset from the text. That is, because the words in the beginning of each line of text are not fully in view, processor 210 may determine that image sensor 220 is tilted in the wrong direction. Responsive thereto, processor 210 may adjust the aiming direction of image sensor 220.

Orientation identification module 601 may be configured to identify an orientation of an image sensor 220 of capturing unit 710. An orientation of an image sensor 220 may be identified, for example, by analysis of images captured by image sensor 220 of capturing unit 710, by tilt or attitude sensing devices within capturing unit 710, and by measuring a relative direction of orientation adjustment unit 705 with respect to the remainder of capturing unit 710.

Orientation adjustment module 602 may be configured to adjust an orientation of image sensor 220 of capturing unit 710. As discussed above, image sensor 220 may be mounted on an orientation adjustment unit 705 configured for movement. Orientation adjustment unit 705 may be configured for rotational and/or lateral movement in response to commands from orientation adjustment module 602. In some embodiments orientation adjustment unit 705 may be adjust an orientation of image sensor 220 via motors, electromagnets, permanent magnets, and/or any suitable combination thereof.

In some embodiments, monitoring module 603 may be provided for continuous monitoring. Such continuous monitoring may include tracking a movement of at least a portion of an object included in one or more images captured by the image sensor. For example, in one embodiment, apparatus 110 may track an object as long as the object remains substantially within the field-of-view of image sensor 220. In additional embodiments, monitoring module 603 may engage orientation adjustment module 602 to instruct orientation adjustment unit 705 to continually orient image sensor 220 towards an object of interest. For example, in one embodiment, monitoring module 603 may cause image sensor 220 to adjust an orientation to ensure that a certain designated object, for example, the face of a particular person, remains within the field-of view of image sensor 220, even as that designated object moves about. In another embodiment, monitoring module 603 may continuously monitor an area of interest included in one or more images captured by the image sensor. For example, a user may be occupied by a certain task, for example, typing on a laptop, while image sensor 220 remains oriented in a particular direction and continuously monitors a portion of each image from a series of images to detect a trigger or other event. For example, image sensor 210 may be oriented towards a piece of laboratory equipment and monitoring module 603 may be configured to monitor a status light on the laboratory equipment for a change in status, while the user's attention is otherwise occupied.

In some embodiments consistent with the present disclosure, capturing unit 710 may include a plurality of image sensors 220. The plurality of image sensors 220 may each be configured to capture different image data. For example, when a plurality of image sensors 220 are provided, the image sensors 220 may capture images having different resolutions, may capture wider or narrower fields of view, and may have different levels of magnification. Image sensors 220 may be provided with varying lenses to permit these different configurations. In some embodiments, a plurality of image sensors 220 may include image sensors 220 having different orientations. Thus, each of the plurality of image sensors 220 may be pointed in a different direction to capture different images. The fields of view of image sensors 220 may be overlapping in some embodiments. The plurality of image sensors 220 may each be configured for orientation adjustment, for example, by being paired with an image adjustment unit 705. In some embodiments, monitoring module 603, or another module associated with memory 550, may be configured to individually adjust the orientations of the plurality of image sensors 220 as well as to turn each of the plurality of image sensors 220 on or off as may be required. In some embodiments, monitoring an object or person captured by an image sensor 220 may include tracking movement of the object across the fields of view of the plurality of image sensors 220.

Embodiments consistent with the present disclosure may include connectors configured to connect a capturing unit and a power unit of a wearable apparatus. Capturing units consistent with the present disclosure may include least one image sensor configured to capture images of an environment of a user. Power units consistent with the present disclosure may be configured to house a power source and/or at least one processing device. Connectors consistent with the present disclosure may be configured to connect the capturing unit and the power unit, and may be configured to secure the apparatus to an article of clothing such that the capturing unit is positioned over an outer surface of the article of clothing and the power unit is positioned under an inner surface of the article of clothing. Exemplary embodiments of capturing units, connectors, and power units consistent with the disclosure are discussed in further detail with respect to FIGS. 8-14.

Figure 8:
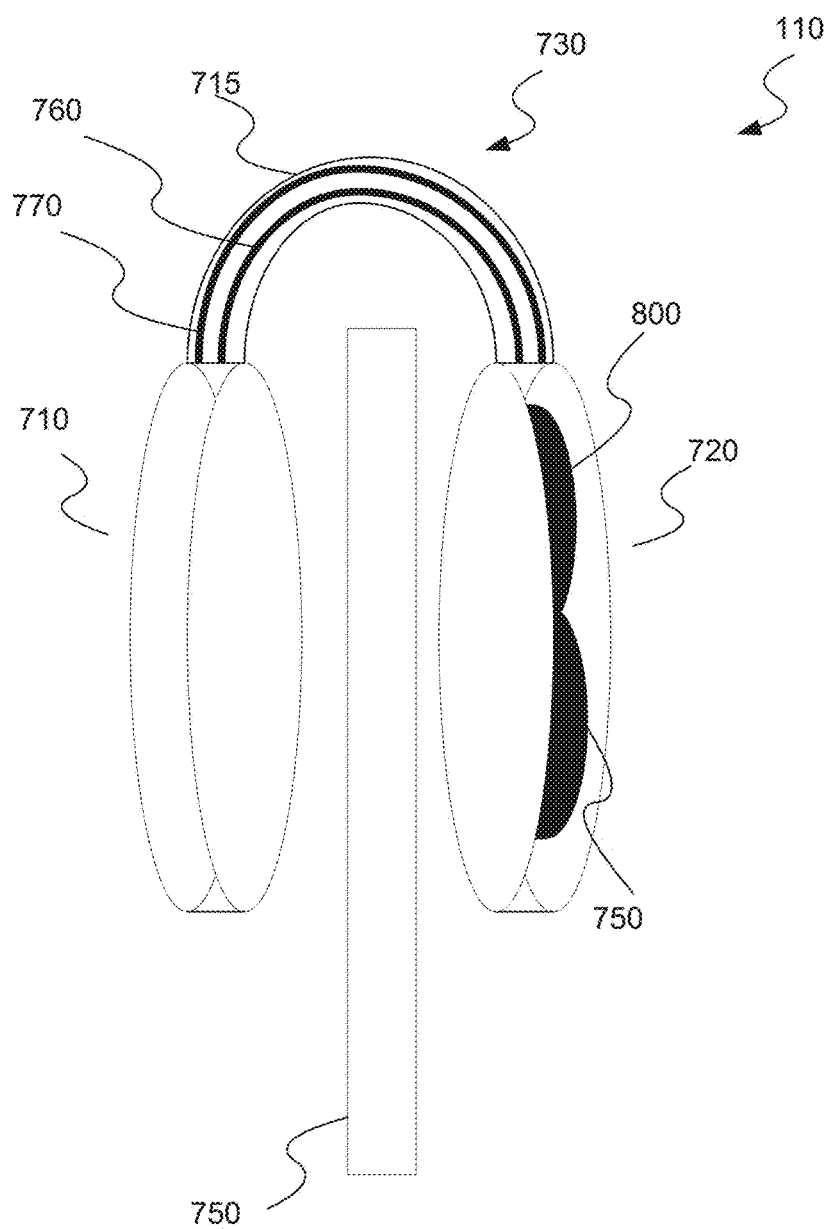
FIG. 8 is a schematic illustration of an embodiment of a wearable apparatus securable to an article of clothing consistent with the present disclosure.

FIG. 8 is a schematic illustration of an embodiment of wearable apparatus 110 securable to an article of clothing consistent with the present disclosure. As illustrated in FIG. 8, capturing unit 710 and power unit 720 may be connected by a connector 730 such that capturing unit 710 is positioned on one side of an article of clothing 750 and power unit 720 is positioned on the opposite side of the clothing 750. In some embodiments, capturing unit 710 may be positioned over an outer surface of the article of clothing 750 and power unit 720 may be located under an inner surface of the article of clothing 750. The power unit 720 may be configured to be placed against the skin of a user.

Capturing unit 710 may include an image sensor 220 and an orientation adjustment unit 705 (as illustrated in FIG. 7). Power unit 720 may include mobile power source 520 and processor 210. Power unit 720 may further include any combination of elements previously discussed that may be a part of wearable apparatus 110, including, but not limited to, wireless transceiver 530, feedback outputting unit 230, memory 550, and data port 570.

Connector 730 may include a clip 715 or other mechanical connection designed to clip or attach capturing unit 710 and power unit 720 to an article of clothing 750 as illustrated in FIG. 8. As illustrated, clip 715 may connect to each of capturing unit 710 and power unit 720 at a perimeter thereof, and may wrap around an edge of the article of clothing 750 to affix the capturing unit 710 and power unit 720 in place. Connector 730 may further include a power cable 760 and a data cable 770. Power cable 760 may be capable of conveying power from mobile power source 520 to image sensor 220 of capturing unit 710. Power cable 760 may also be configured to provide power to any other elements of capturing unit 710, e.g., orientation adjustment unit 705. Data cable 770 may be capable of conveying captured image data from image sensor 220 in capturing unit 710 to processor 800 in the power unit 720. Data cable 770 may be further capable of conveying additional data between capturing unit 710 and processor 800, e.g., control instructions for orientation adjustment unit 705.

Figure 9:
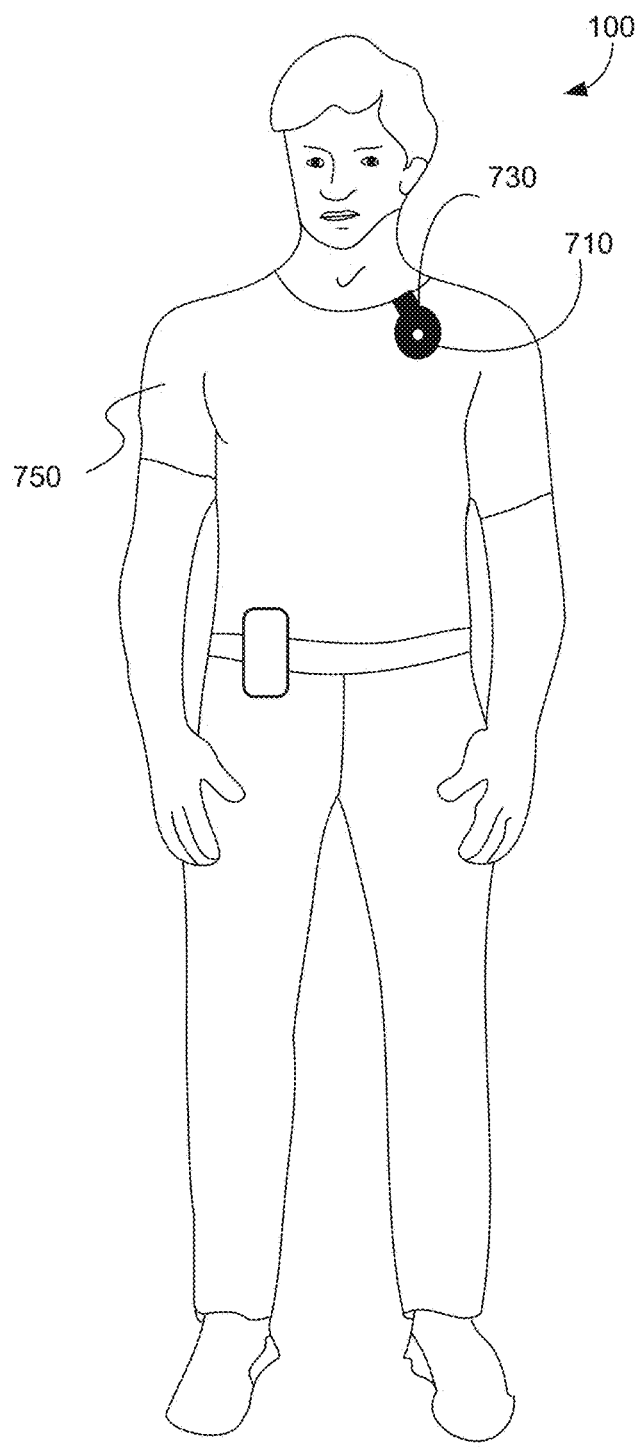
FIG. 9 is a schematic illustration of a user wearing a wearable apparatus consistent with an embodiment of the present disclosure.

FIG. 9 is a schematic illustration of a user 100 wearing a wearable apparatus 110 consistent with an embodiment of the present disclosure. As illustrated in FIG. 9, capturing unit 710 is located on an exterior surface of the clothing 750 of user 100. Capturing unit 710 is connected to power unit 720 (not seen in this illustration) via connector 730, which wraps around an edge of clothing 750.

Figure 10:
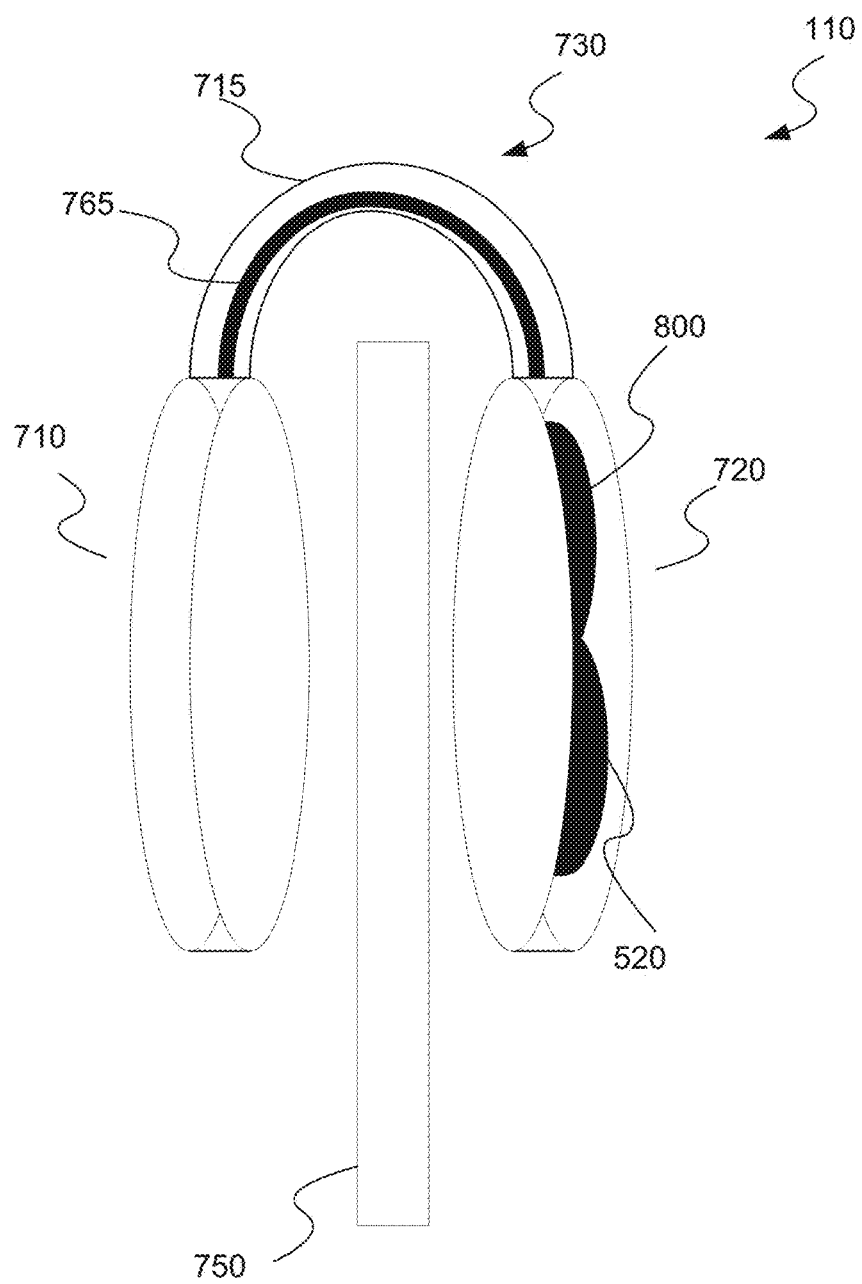
FIG. 10 is a schematic illustration of an embodiment of a wearable apparatus securable to an article of clothing consistent with the present disclosure.

In some embodiments, connector 730 may include a flexible printed circuit board (PCB). FIG. 10 illustrates an exemplary embodiment wherein connector 730 includes a flexible printed circuit board 765. Flexible printed circuit board 765 may include data connections and power connections between capturing unit 710 and power unit 720. Thus, in some embodiments, flexible printed circuit board 765 may serve to replace power cable 760 and data cable 770. In alternative embodiments, flexible printed circuit board 765 may be included in addition to at least one of power cable 760 and data cable 770. In various embodiments discussed herein, flexible printed circuit board 765 may be substituted for, or included in addition to, power cable 760 and data cable 770.

Figure 11:
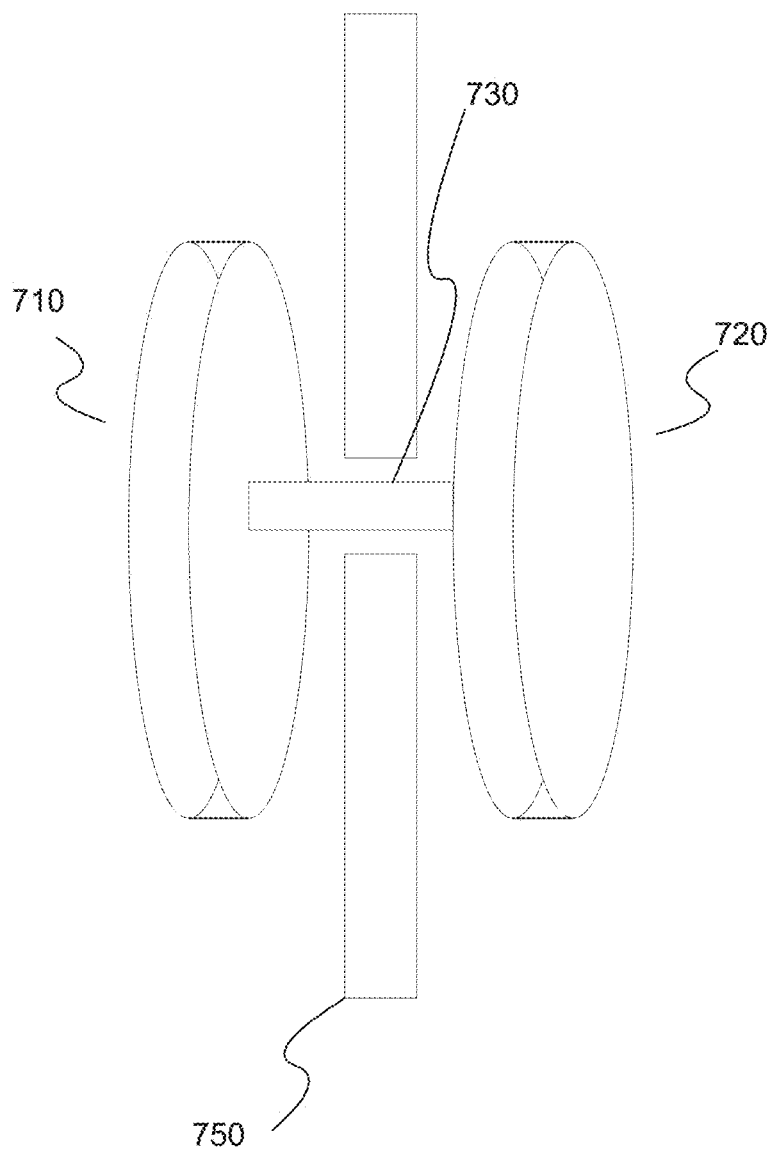
FIG. 11 is a schematic illustration of an embodiment of a wearable apparatus securable to an article of clothing consistent with the present disclosure.

FIG. 11 is a schematic illustration of another embodiment of a wearable apparatus securable to an article of clothing consistent with the present disclosure. As illustrated in FIG. 11, connector 730 may be centrally located with respect to capturing unit 710 and power unit 720. Central location of connector 730 may facilitate affixing apparatus 110 to clothing 750 through a hole in clothing 750 such as, for example, a button-hole in an existing article of clothing 750 or a specialty hole in an article of clothing 750 designed to accommodate wearable apparatus 110.

Figure 12:
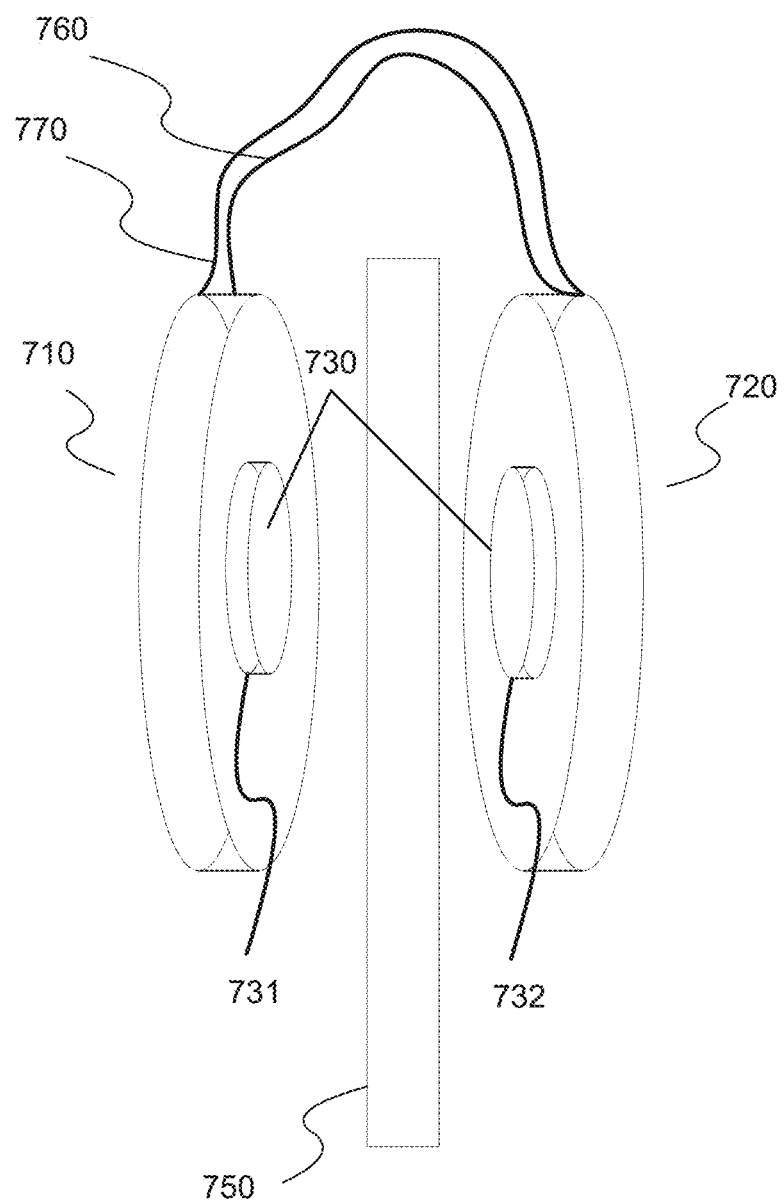
FIG. 12 is a schematic illustration of an embodiment of a wearable apparatus securable to an article of clothing consistent with the present disclosure.

FIG. 12 is a schematic illustration of still another embodiment of wearable apparatus 110 securable to an article of clothing. As illustrated in FIG. 12, connector 730 may include a first magnet 731 and a second magnet 732. First magnet 731 and second magnet 732 may secure capturing unit 710 to power unit 720 with the article of clothing positioned between first magnet 731 and second magnet 732. In embodiments including first magnet 731 and second magnet 732, power cable 760 and data cable 770 may also be included. In these embodiments, power cable 760 and data cable 770 may be of any length, and may provide a flexible power and data connection between capturing unit 710 and power unit 720. Embodiments including first magnet 731 and second magnet 732 may further include a flexible PCB 765 connection in addition to or instead of power cable 760 and/or data cable 770. In some embodiments, first magnet 731 or second magnet 732 may be replaced by an object comprising a metal material.

Figure 13:
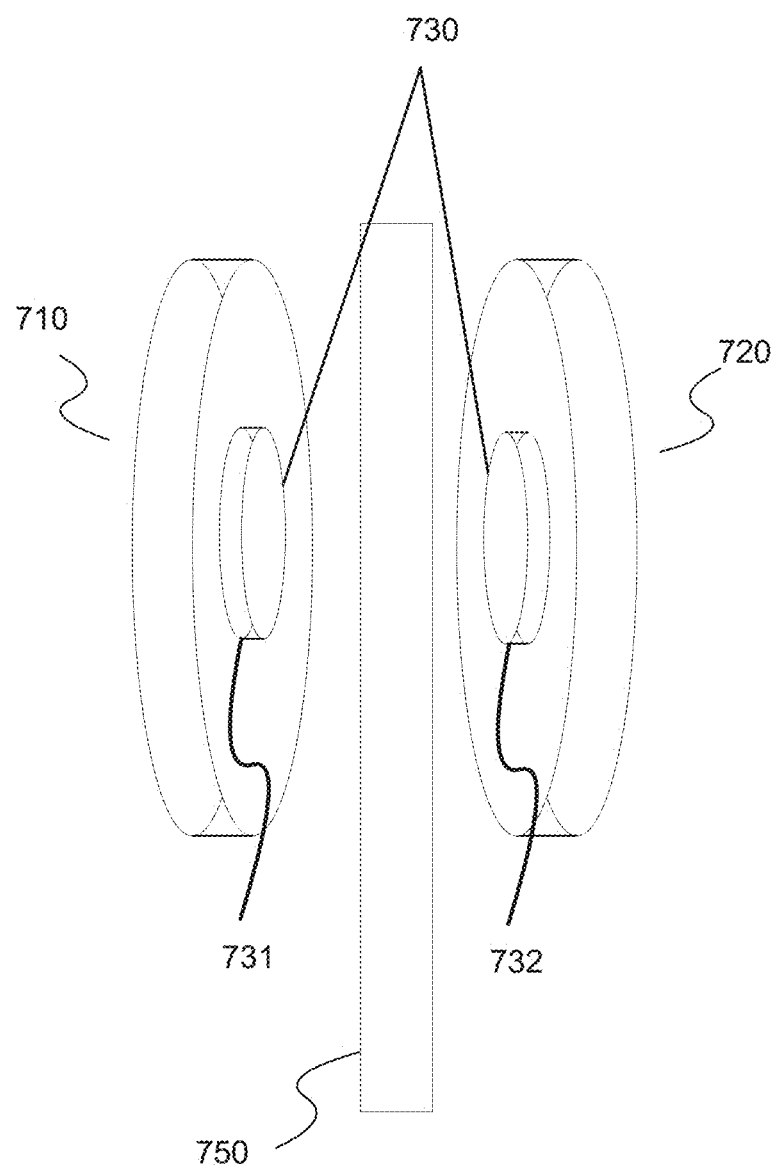
FIG. 13 is a schematic illustration of an embodiment of a wearable apparatus securable to an article of clothing consistent with the present disclosure.

FIG. 13 is a schematic illustration of yet another embodiment of a wearable apparatus 110 securable to an article of clothing. FIG. 13 illustrates an embodiment wherein power and data may be wirelessly transferred between capturing unit 710 and power unit 720. As illustrated in FIG. 13, first magnet 731 and second magnet 732 may be provided as connector 730 to secure capturing unit 710 and power unit 720 to an article of clothing 750. Power and/or data may be transferred between capturing unit 710 and power unit 720 via any suitable wireless technology, for example, magnetic and/or capacitive coupling, near field communication technologies, radiofrequency transfer, and any other wireless technology suitable for transferring data and/or power across short distances.

Figure 14:
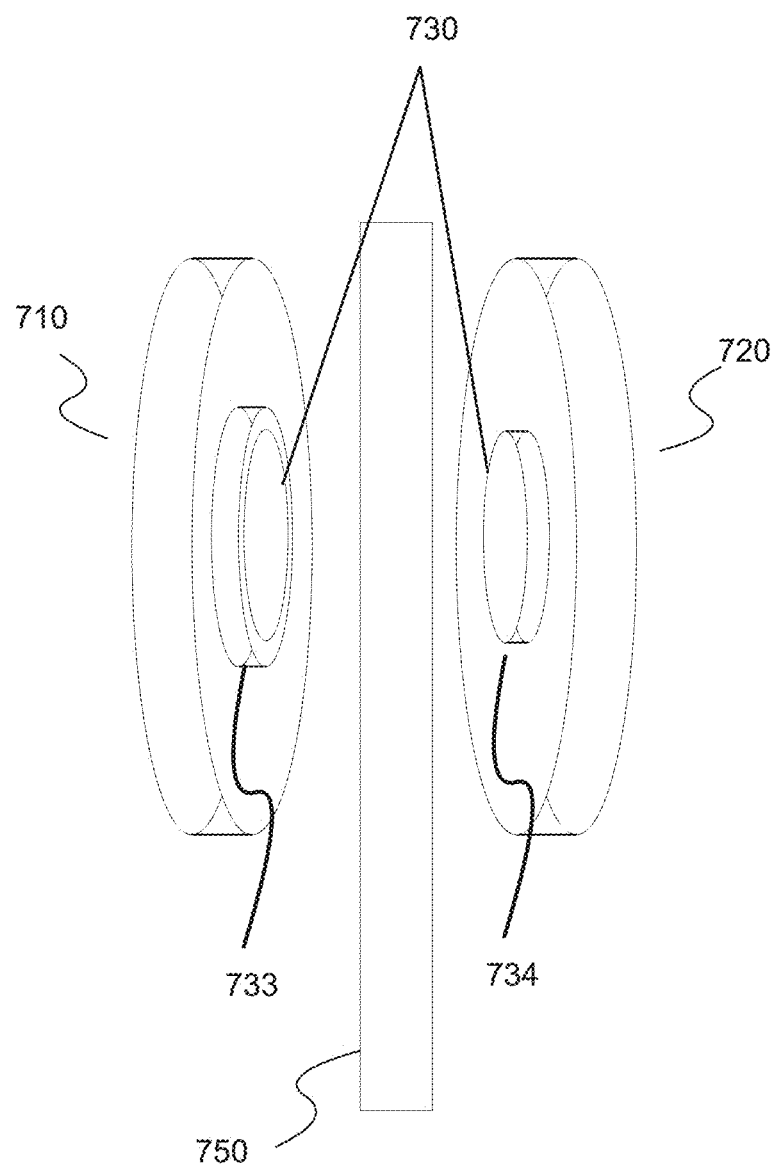
FIG. 14 is a schematic illustration of an embodiment of a wearable apparatus securable to an article of clothing consistent with the present disclosure.

FIG. 14 illustrates still another embodiment of wearable apparatus 110 securable to an article of clothing 750 of a user. As illustrated in FIG. 14, connector 730 may include features designed for a contact fit. For example, capturing unit 710 may include a ring 733 with a hollow center having a diameter slightly larger than a disk-shaped protrusion 734 located on power unit 720. When pressed together with fabric of an article of clothing 750 between them, disk-shaped protrusion 734 may fit tightly inside ring 733, securing capturing unit 710 to power unit 720. FIG. 14 illustrates an embodiment that does not include any cabling or other physical connection between capturing unit 710 and power unit 720. In this embodiment, capturing unit 710 and power unit 720 may transfer power and data wirelessly. In alternative embodiments, capturing unit 710 and power unit 720 may transfer power and data via at least one of cable 760, data cable 770, and flexible printed circuit board 765.

Figure 15:
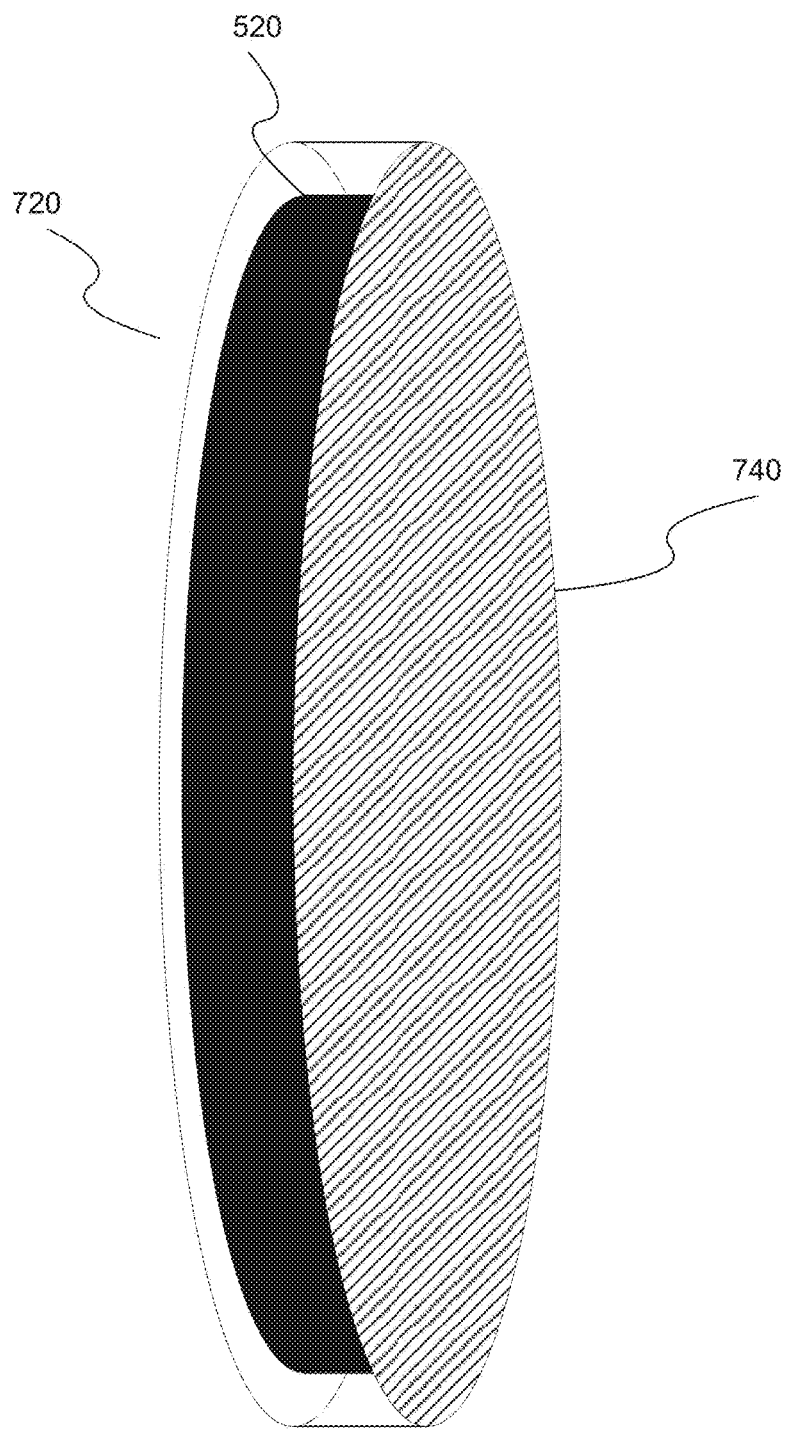
FIG. 15 is a schematic illustration of an embodiment of a wearable apparatus power unit including a power source.

FIG. 15 illustrates another aspect of power unit 720 consistent with embodiments described herein. Power unit 720 may be configured to be positioned directly against the user's skin. To facilitate such positioning, power unit 720 may further include at least one surface coated with a biocompatible material 740. Biocompatible materials 740 may include materials that will not negatively react with the skin of the user when worn against the skin for extended periods of time. Such materials may include, for example, silicone, PTFE, kapton, polyimide, titanium, nitinol, platinum, and others. Also as illustrated in FIG. 15, power unit 720 may be sized such that an inner volume of the power unit is substantially filled by mobile power source 520. That is, in some embodiments, the inner volume of power unit 720 may be such that the volume does not accommodate any additional components except for mobile power source 520. In some embodiments, mobile power source 520 may take advantage of its close proximity to the skin of user's skin. For example, mobile power source 520 may use the Peltier effect to produce power and/or charge the power source.

Figure 16:
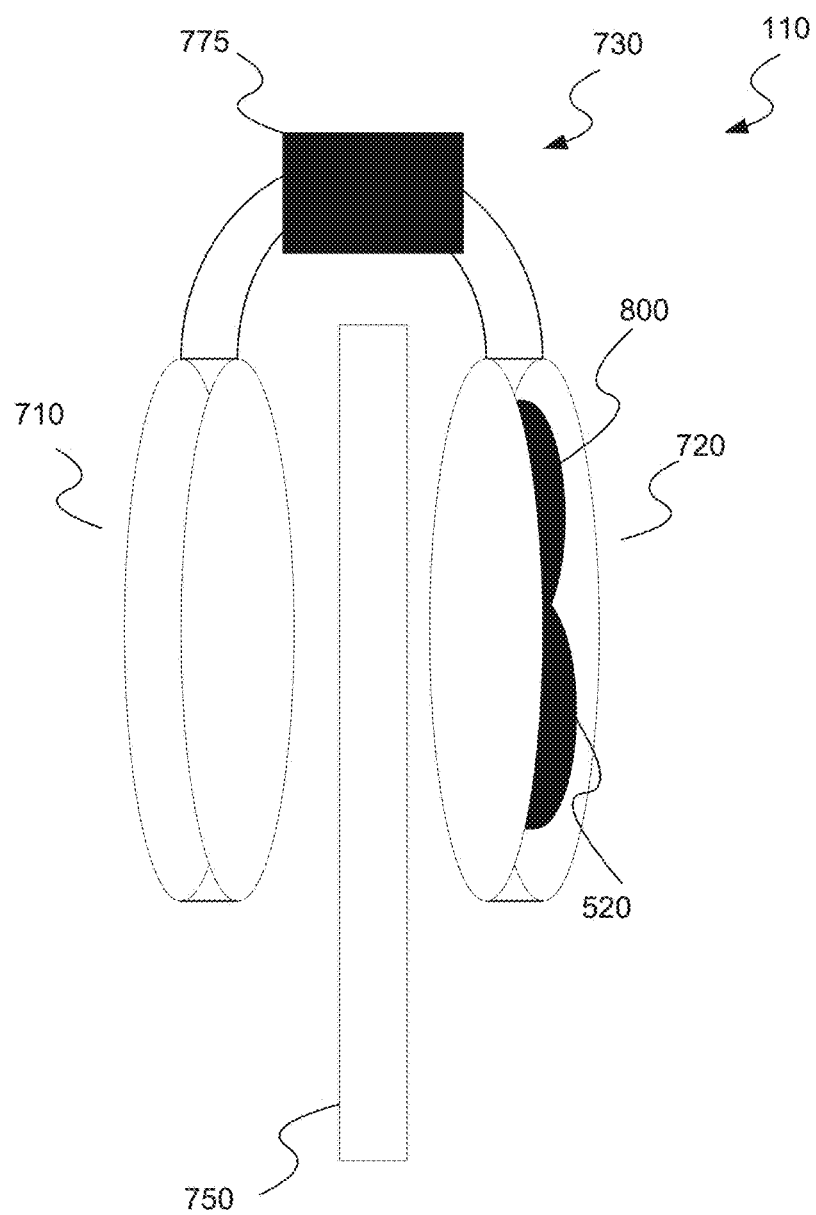
FIG. 16 is a schematic illustration of an exemplary embodiment of a wearable apparatus including protective circuitry.

In further embodiments, an apparatus securable to an article of clothing may further include protective circuitry associated with power source 520 housed in power unit 720. FIG. 16 illustrates an exemplary embodiment including protective circuitry 775. As illustrated in FIG. 16, protective circuitry 775 may be located remotely with respect to power unit 720. In alternative embodiments, protective circuitry 775 may also be located in capturing unit 710, on flexible printed circuit board 765, or in power unit 720.

Protective circuitry 775 may be configured to protect image sensor 220 and/or other elements of capturing unit 710 from potentially dangerous currents and/or voltages produced by mobile power source 520. Protective circuitry 775 may include passive components such as capacitors, resistors, diodes, inductors, etc., to provide protection to elements of capturing unit 710. In some embodiments, protective circuitry 775 may also include active components, such as transistors, to provide protection to elements of capturing unit 710. For example, in some embodiments, protective circuitry 775 may comprise one or more resistors serving as fuses. Each fuse may comprise a wire or strip that melts (thereby braking a connection between circuitry of image capturing unit 710 and circuitry of power unit 720) when current flowing through the fuse exceeds a predetermined limit (e.g., 500 milliamps, 900 milliamps, 1 amp, 1.1 amps, 2 amp, 2.1 amps, 3 amps, etc.) Any or all of the previously described embodiments may incorporate protective circuitry 775.

In some embodiments, the wearable apparatus may transmit data to a computing device (e.g., a smartphone, tablet, watch, computer, etc.) over one or more networks via any known wireless standard (e.g., cellular, Wi-Fi, Bluetooth®, etc.), or via near-filed capacitive coupling, other short range wireless techniques, or via a wired connection. Similarly, the wearable apparatus may receive data from the computing device over one or more networks via any known wireless standard (e.g., cellular, Wi-Fi, Bluetooth®, etc.), or via near-filed capacitive coupling, other short range wireless techniques, or via a wired connection. The data transmitted to the wearable apparatus and/or received by the wireless apparatus may include images, portions of images, identifiers related to information appearing in analyzed images or associated with analyzed audio, or any other data representing image and/or audio data. For example, an image may be analyzed and an identifier related to an activity occurring in the image may be transmitted to the computing device (e.g., the "paired device"). In the embodiments described herein, the wearable apparatus may process images and/or audio locally (on board the wearable apparatus) and/or remotely (via a computing device). Further, in the embodiments described herein, the wearable apparatus may transmit data related to the analysis of images and/or audio to a computing device for further analysis, display, and/or transmission to another device (e.g., a paired device). Further, a paired device may execute one or more applications (apps) to process, display, and/or analyze data (e.g., identifiers, text, images, audio, etc.) received from the wearable apparatus.

Some of the disclosed embodiments may involve systems, devices, methods, and software products for determining at least one keyword. For example, at least one keyword may be determined based on data collected by apparatus 110. At least one search query may be determined based on the at least one keyword. The at least one search query may be transmitted to a search engine.

In some embodiments, at least one keyword may be determined based on at least one or more images captured by image sensor 220. In some cases, the at least one keyword may be selected from a keywords pool stored in memory. In some cases, optical character recognition (OCR) may be performed on at least one image captured by image sensor 220, and the at least one keyword may be determined based on the OCR result. In some cases, at least one image captured by image sensor 220 may be analyzed to recognize: a person, an object, a location, a scene, and so forth. Further, the at least one keyword may be determined based on the recognized person, object, location, scene, etc. For example, the at least one keyword may comprise: a person's name, an object's name, a place's name, a date, a sport team's name, a movie's name, a book's name, and so forth.

In some embodiments, at least one keyword may be determined based on the user's behavior. The user's behavior may be determined based on an analysis of the one or more images captured by image sensor 220. In some embodiments, at least one keyword may be determined based on activities of a user and/or other person. The one or more images captured by image sensor 220 may be analyzed to identify the activities of the user and/or the other person who appears in one or more images captured by image sensor 220. In some embodiments, at least one keyword may be determined based on at least one or more audio segments captured by apparatus 110. In some embodiments, at least one keyword may be determined based on at least GPS information associated with the user. In some embodiments, at least one keyword may be determined based on at least the current time and/or date.

In some embodiments, at least one search query may be determined based on at least one keyword. In some cases, the at least one search query may comprise the at least one keyword. In some cases, the at least one search query may comprise the at least one keyword and additional keywords provided by the user. In some cases, the at least one search query may comprise the at least one keyword and one or more images, such as images captured by image sensor 220. In some cases, the at least one search query may comprise the at least one keyword and one or more audio segments, such as audio segments captured by apparatus 110.

In some embodiments, the at least one search query may be transmitted to a search engine. In some embodiments, search results provided by the search engine in response to the at least one search query may be provided to the user. In some embodiments, the at least one search query may be used to access a database.

For example, in one embodiment, the keywords may include a name of a type of food, such as quinoa, or a brand name of a food product; and the search will output information related to desirable quantities of consumption, facts about the nutritional profile, and so forth. In another example, in one embodiment, the keywords may include a name of a restaurant, and the search will output information related to the restaurant, such as a menu, opening hours, reviews, and so forth. The name of the restaurant may be obtained using OCR on an image of signage, using GPS information, and so forth. In another example, in one embodiment, the keywords may include a name of a person, and the search will provide information from a social network profile of the person. The name of the person may be obtained using OCR on an image of a name tag attached to the person's shirt, using face recognition algorithms, and so forth. In another example, in one embodiment, the keywords may include a name of a book, and the search will output information related to the book, such as reviews, sales statistics, information regarding the author of the book, and so forth. In another example, in one embodiment, the keywords may include a name of a movie, and the search will output information related to the movie, such as reviews, box office statistics, information regarding the cast of the movie, show times, and so forth. In another example, in one embodiment, the keywords may include a name of a sport team, and the search will output information related to the sport team, such as statistics, latest results, future schedule, information regarding the players of the sport team, and so forth. For example, the name of the sport team may be obtained using audio recognition algorithms.

Determining and Distributing an Inference Model Update

In some embodiments, a wearable apparatus (e.g., wearable apparatus 110, discussed above) may use an inference model to analyze and/or classify one or more images (or a portion of one or more images) captured by one or more image sensors (e.g., image sensor 220) of the wearable apparatus. The analysis and/or classification may include determining a type of an object in an environment of a user of the wearable apparatus, determining an identify of a person in an environment of a user of the wearable apparatus based on one more features of a person's face (e.g., facial recognition), identifying a visual trigger (e.g., a trigger that includes a hand gesture), detecting an action (e.g., a handshake), determining a location of a user of the wearable apparatus based on characteristics of the user's environment, and/or extracting and recognizing text (e.g., using optical character recognition) from an environment of a user of the wearable apparatus.

As used herein, an "inference model" refers to a set of assumptions, rules, or principles by which conclusions may be drawn, explained, or expected based on data and reasoning. An inference model may include, but is not limited to, a neural network (e.g., a convolutional neural network), a regression model, or a classifier. For example, as known in the art, a "regression model" refers to a statistical process for modeling and analyzing relationships among several variables, such as a relationship between a dependent variable and one or more independent variables to predict how the value of the dependent variable changes when any one of the independent variables is varied while the other independent variables are held fixed. A "classifier" refers to a broad range of approaches and models for categorizing data (e.g., identification of images), as known by the skilled persons in the field. For example, a classifier may include a neural network, a random forest, a support vector machine, and so forth.

In some embodiments, an inference model may implement machine learning (e.g., deep machine learning). "Deep machine learning" refers to a class of machine learning algorithms that may use many layers of linear and/or non-linear processing devices for feature extraction and transformation, in which each successive layer uses output from a previous layer as input. Deep machine learning may be supervised (e.g., classification) or unsupervised (e.g., pattern analysis), and higher level features may be derived from lower level features to form a hierarchical representation of data (e.g., pixels of an image). An observation (e.g., an image, audio data, etc.) may be represented in many ways, for example, a vector of intensity values per pixel, a set of edges, regions of a particular shape, sampled signals, frequencies, etc. Deep machine learning architectures may include deep neural networks, convolutional deep neural networks, deep belief networks, recurrent neural networks, and so forth.

A "neural network" is a computational model or system based on a large collection of simple neural units (i.e., neurons). The large collection of neural units may be organized into different layers of neural units, for example, an input layer, one or more hidden layers, and an output layer. Each neural unit may be connected with many other neural units of different layers, and be computed using an activation function (e.g., a summation function). Observations (e.g., patterns) may be presented to the neural network via the input layer, which communicates to the one or more hidden layers where the actual processing may be done using an activation function via a model of weighted connections. The hidden layers may link to the output layer, which may provide a result of the processing as an output. In some embodiments, a neural network may be self-learning and trained by examples. For example, learning rules may be applied to neural networks to modify one or more weights of the connections according to the input.

In some embodiments, a neural network may include a back-propagation neural network that involves the backwards propagation of an error. In a back-propagation neural network, learning may occur with each cycle (e.g., each time the neural network is presented with a new input observation) through a forward activation flow of outputs, and the backwards error propagation of weight adjustments. Specifically, when a back-propagation neural network is initially presented with an input, it may make a random guess as to what the input might be. The back-propagation neural network may then determine how far much its answer deviated from the actual answer and adjust its connection weights. To quantify the error, a cost function (also referred to as a loss function) may be employed such as, for example, a mean squared error function. The aim of the learning rules is to minimize the cost as a function of the connection weights, which may be achieved via a gradient descent technique or algorithm. For example, a set of weights and/or other neural network parameters may be identified to make the cost as small as possible. Back-propagation techniques may include performing a gradient descent within the solution's vector space towards a global minimum of the cost function. The global minimum may provide a theoretical solution with the lowest possible error.

In some embodiments, a wearable apparatus (e.g., wearable apparatus 110) may store an inference model and apply the inference model when analyzing one or more images captured by the wearable apparatus. The wearable apparatus may store the inference model as one or more program models and associated data in, for example, a memory device included in the wearable apparatus and/or the wearable apparatus may access the inference model over a network (e.g., network 240).

When a wearable apparatus is equipped with an inference model, wearable apparatus 110 may analyze one or more images captured by an image sensor (e.g., image sensor 220) of the wearable apparatus. For example, the wearable apparatus may use the inference to determine a type of an object in an environment of a user (e.g., user 100), determine an identify of a person in an environment of the user based on one more features of a person's face (e.g., facial recognition), determine a location of the user based on characteristics of the user's environment, and/or extract and recognize (e.g., using optical character recognition) text from an environment of the user.

During typical operation, the wearable apparatus using the inference model will perform as expected and correctly analyze images and provide correct classifications. Wearable apparatus 110 may then communicate information related to the analyzed images to, for example, computing device 120 for the user to view (e.g., by displaying data on display 260 of computing device 120) and/or transmit the results to a remote server (e.g., server 250). However, in some circumstances, wearable apparatus 110 may incorrectly classify an image. Further, in some circumstances, wearable apparatus 110 may determine that an update should be made to the inference model to improve accuracy of the inference model. Under such circumstances, an update or modification to the inference model may be warranted.

Wearable apparatus 110, employing an inference model, may determine that an error in image analysis and/or classification has occurred in a variety of ways. For example, the inference model may determine (or infer) that one or more images in a sequence of image frames (e.g., consecutively captured images or consecutive frames of a video) has been classified incorrectly. As an example, the inference model may classify a first image in a series taken at a time t1 as a bus, the inference model may classify a second image taken at time t2 as a cement truck, and the inference model may classify a third image taken at time t3 as a bus. In view of these classifications, the inference model may infer that it is highly likely that, given a short period of time between t1 and t2 (e.g., less than a second, 1 second, 2 seconds), and a short period of time between t2 and t3 (e.g., less than a second, 1 second, 2 seconds), that the second image in the series in fact includes a bus and not a cement truck. Accordingly, under such circumstances, the inference model may determine that an error occurred without user intervention or input.

As another example, wearable apparatus 110, employing an inference model, may determine that an update should be made to the inference model. For example, when wearable apparatus 110 performs facial recognition to identify an individual in one or more images, wearable apparatus 110 may use one or more image analysis techniques and/or classify one or more aspects or features of the one or image images. The inference model may classify the features in an image and/or compare features in an image to known parameters (e.g., certain dimension or characteristics of a face). These classifications may be based on determining certain distances between facial features in an image (e.g., the distance between the eyes or the distance from a portion of a nose to an ear, a hairline's location relative to the eyes or other part of the face, a hairline's distance to another feature of the face, etc.) and/or the shape or contours of a face. To improve the accuracy of the inference model, the inference model may determine that certain adjustments to the inference model may be appropriate to improve facial recognition accuracy when recognizing a face as a particular individual. For example, the accuracy of the inference model may be improved when it has been determined that a parameter should be updated to account for a change (e.g., the individual has had their hair cut shorter and, accordingly, the location of a hairline should be updated) that is not currently reflected in the inference model. The change may involve, for example, weighing certain inputs to the model differently. Accordingly, under such circumstances, information pertaining to an adjustment to the inference model for recognizing a face of an individual may constitute update information.

In other embodiments, wearable apparatus 110 may receive feedback from the user regarding a classification error or update. For example, after receiving information via computing device 120 related to a classification made by wearable apparatus 110, the user may provide feedback through computing device 120 and/or via button or input provided on wearable apparatus 110. The feedback may include information indicating that a classification provided by wearable apparatus 110 was incorrect or should be updated, and may further include information identifying a corrected classification. For example, the feedback may include correction information associated with a classification of an object or a person depicted in at least one of the images captured by the camera present on the wearable apparatus. The "correction information" may include any data input by a user identifying an image classification error.

As described above in connection with FIG. 2, wearable apparatus 110 may transfer data to computing device 120 and/or server 250 via network 240, and may receive data from computing device 120 and/or server 250 via network 240. In some embodiments, such data may include update information associated with an inference model. As used herein, "update information" may include any information related to at least one aspect of an inference model. For example, in some embodiments, the at least one aspect of the inference model may include or be based on a direction of a gradient (or a direction of a portion of a gradient) derived from one or more images captured by a camera (e.g., image sensor 220) present on a wearable apparatus (e.g., wearable apparatus 110). As used herein, a "gradient" is a multi-variable generalization of a derivative and represents a slope of a tangent of a graph of a function. A "direction of the gradient" specifies a direction of a greatest rate of increase of the function. In some embodiments, the gradient or the direction of the gradient may have been derived during an analysis of images; for example, when applying an image classification technique. The image classification technique may be used classify features of an image. In some embodiments, the image classification technique may include image enhancement, edge detection, image analysis, or data extraction.

In other embodiments, the at least one aspect of the inference model may include a magnitude of the direction of a gradient (or a magnitude of the direction of a portion of a gradient) derived from one or more images captured by a camera (e.g., an image sensor) present on a wearable apparatus (e.g., wearable apparatus 110). A "magnitude of the direction of a gradient" specifies a slope of a graph in the direction of the gradient. In yet other embodiments, the at least one aspect of the inference model may include both a direction and a magnitude of a gradient (or both a direction and a magnitude of a portion of a gradient).

In some embodiments, the update information may be insufficient to reconstruct any of the one or more images captured by the camera present on the wearable apparatus. For example, when the update information includes a direction of a portion of a gradient and/or a magnitude of a portion of a gradient, recovery of the images from which the gradient was derived may not be possible. Consequently, update information transmitted from a wearable apparatus to a server for further processing may not reveal private information of the user of the wearable apparatus (e.g., the images captured by the wearable apparatus are not transmitted beyond the wearable apparatus).

In some embodiments, a wearable apparatus may have derived the update information from a comparison of at least two of the images captured by a camera present on the wearable apparatus. In embodiments in which the update information includes a direction of a gradient (or a portion of a gradient), the wearable apparatus may have derived the direction of the gradient (or the portion of the gradient) to correct an image classification technique. In some examples, the gradient may be computed in a back-propagation scheme, in a stochastic gradient descent scheme, and so forth. As discussed above, in some embodiments, the image classification technique may include image enhancement, edge detection, image analysis, or data extraction.

In some embodiments, a server (e.g., server 250) may receive update information from a plurality of wearable apparatuses (e.g., each wearable apparatus may be similar in construction to wearable apparatus 110). The server may analyze the update information received from the plurality of wearable apparatuses in order to determine a global update to the inference model. As used herein, a "global update" may include information for modifying at least one aspect of an inference model determined from update information received from a plurality of wearable apparatuses. In some embodiments, the server may determine the global update based on a gradient descent update of the inference model. A "gradient descent" is a first-order iterative optimization algorithm, as known to those of skill in the art. In other embodiments, the server may determine a global update based on a prediction made by the inference model. As used herein, a "prediction" may include any inference or conclusion drawn from analysis of input to an inference model.

In yet other embodiments, the server may determine a global update is based on an aggregate of directions of gradients (or portions of gradients) received from a plurality of wearable devices. In still yet other embodiments, the server may determine a global update based on a median of a first direction of a first gradient (or a portion of a first gradient) received from a first wearable apparatus and a second direction of a second gradient (or a portion of a second gradient) received from a second wearable apparatus. In yet other embodiments, the server may select as a global update one of a first direction of a first gradient (or a portion of a first gradient) received from a first wearable apparatus and a second direction of a second gradient (or a portion of a second gradient) received from a second wearable apparatus.

After determining a global update, the server may transmit the global update to a plurality of wearable apparatuses. The plurality of wearable apparatuses may then update a locally stored inference model based on the global update. The wearable apparatuses may then use the updated inference model for future image analysis and/or classification operations.

Figure 17A:
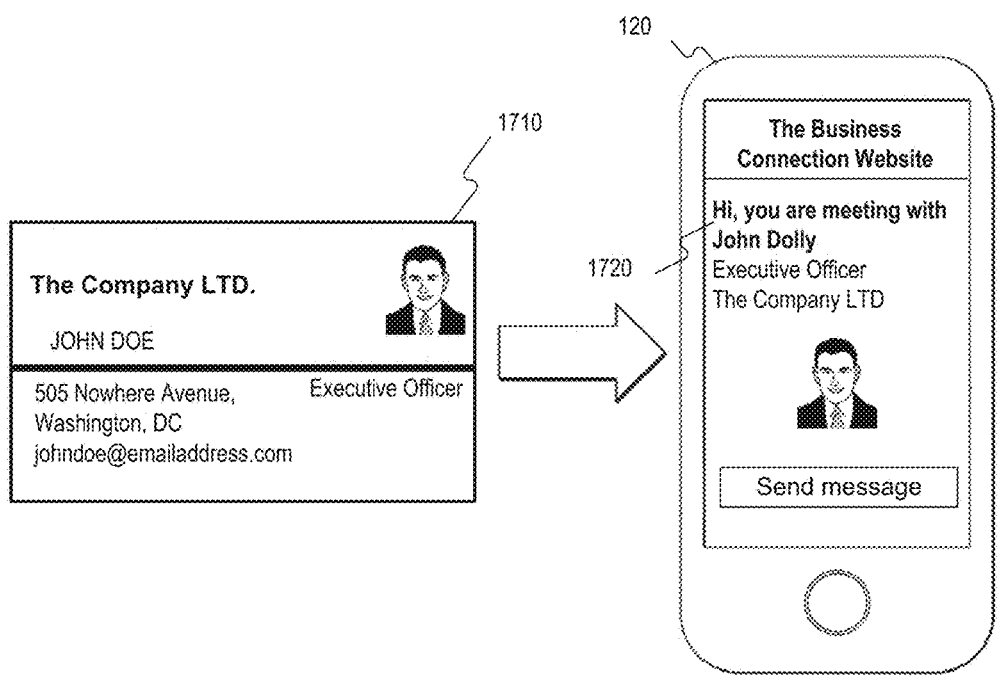
FIG. 17A illustrates an exemplary incorrect classification of an image consistent with the present disclosure.
Figure 17B:
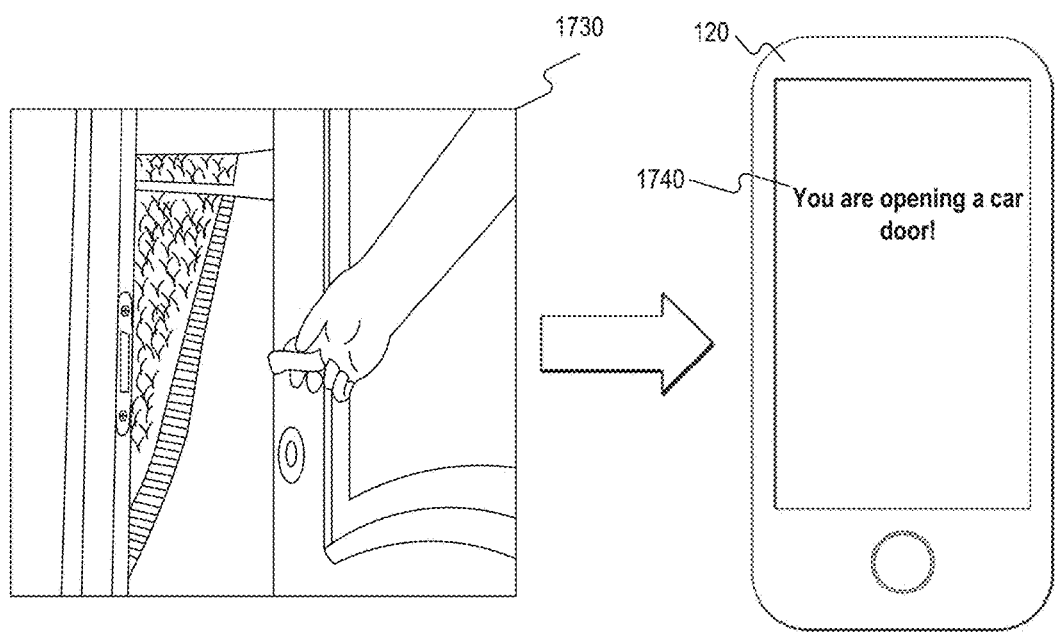
FIG. 17B illustrates another exemplary incorrect classification of an image consistent with the present disclosure.
Figure 17C:
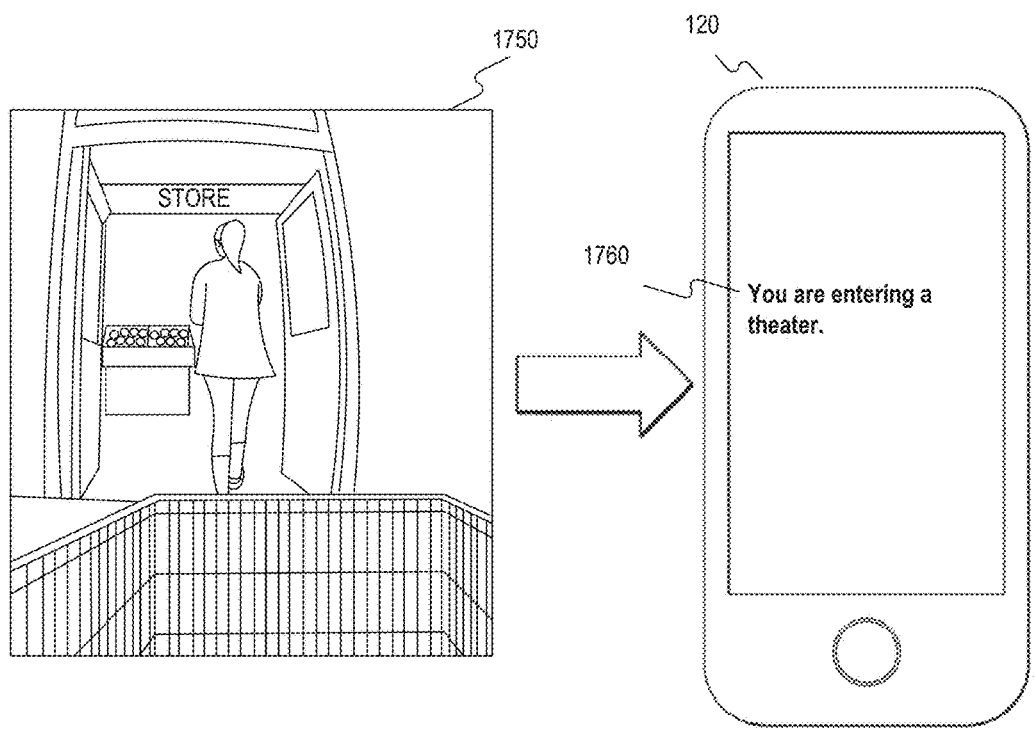
FIG. 17C illustrates yet another exemplary incorrect classification of an image consistent with the present disclosure.

FIGS. 17A, 17B, and 17C, depict examples in which an inference model used by a wearable apparatus (e.g., wearable apparatus 110) incorrectly classified one or more images. Such incorrect classifications may prompt a wearable apparatus to transmit update information associated with the inference model to a server for analysis and potentially for use in updating and/or modifying the inference model.

In the example shown in FIG. 17A, an image 1710 captured by wearable apparatus 110 depicts a business card of "John Doe" captured by image sensor 220. However, the image has been incorrectly classified by an inference model as a business card belonging to "John Dolly" instead of "John Doe," as shown in a message 1720 displayed on computing device 120. In the example shown in FIG. 17B, user 100 has opened a home door 1730, an image of which has been captured by image sensor 220 of wearable apparatus 110. However, the inference model incorrectly classified the image as "You are opening a car door!," as shown by a message 1740 displayed on computing device 120. In the example shown in FIG. 17C, user 100 is about to enter a grocery store 1750, as shown in the image captured by image sensor 220 of wearable apparatus. In this case, however, the inference model incorrectly classified the image as "You are entering a theater," as shown by a message 1760 displayed on computing device 120.

In any of the above examples shown in FIGS. 17A, 17B, and 17C, wearable apparatus 110, using an inference model, may transmit update information associated with the inference model to a server. Furthermore, as discussed above, in some embodiments, the update information may be insufficient to reconstruct any of the images from which the update information was derived. Accordingly, the privacy of the users of the wearable apparatuses may be preserved.

The following discussion describes operations of server 250 in which server 250 may receive update information associated with an inference model from a plurality of wearable apparatuses (e.g., each similar in construction to wearable apparatus 110). The plurality of wearable apparatuses may be worn or used by a set of users who form a community of users. The users may or may not know each other, and may be located anywhere such that the community of users may be a virtual online community. Furthermore, the plurality of wearable apparatuses may communicate with one another and server 250 via a network (e.g., network 240, discussed above).

Figure 18:
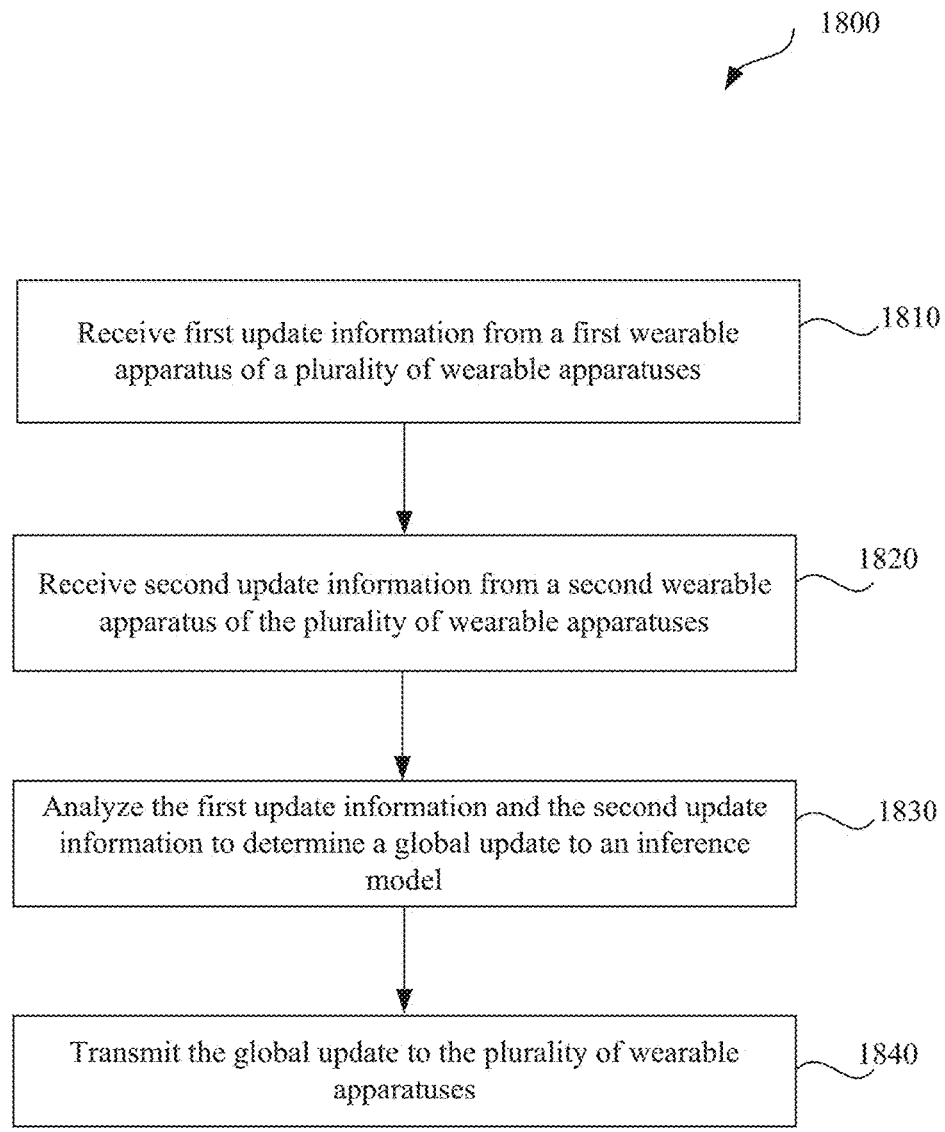
FIG. 18 illustrates a flowchart of a method for determining a global update to an inference model and distributing the global update to a plurality of wearable apparatuses.

FIG. 18 illustrates a flowchart of a method 1800 for determining a global update to an inference model and distributing the global update to a plurality of wearable apparatuses, consistent with disclosed embodiments. In some embodiments, server 250 may receive update information from the plurality of wearable apparatus in a form that preserves the privacy of users of the wearable apparatuses. Although the following description refers to receiving update information from two wearable apparatuses, one of ordinary skill in the art will recognize that update information may be received from any number of wearable apparatuses (e.g., two, three, four, five, ten, twenty, fifty, a hundred, a thousand, or more) and be used to determine a global update to an inference model. Furthermore, in some embodiments, the inference model may include a neural network (e.g., a convolutional neural network), a regression model, or a classifier.

In step 1810, server 250 may receive, via a data interface (e.g., the data interface discussed above in connection with FIG. 2), first update information from a first wearable apparatus of a plurality of wearable apparatuses. The first update information may be associated with an interface model used by the first wearable apparatus. In some embodiments, the first update information may include a first direction of a portion of a first gradient derived from one or more images captured by a camera present on the first wearable apparatus.

Prior to sending the first update information to server 250, the first wearable apparatus may have derived the first direction from a comparison of at least two of the images captured by the camera present on the first wearable apparatus, or from a comparison of classification results. Furthermore, the first wearable apparatus may have derived the first direction to correct an image classification technique. In some embodiments, the first wearable apparatus may have derived the first direction from feedback received from a user of the first wearable apparatus. The feedback may include correction information associated with a classification of an object or a person depicted in at least one of the images captured by the camera present on the first wearable apparatus.

In step 1820, server 250 may receive, via the data interface, second update information from a second wearable apparatus of the plurality of wearable apparatuses. Similar the first update information, the second update information may be associated with an interface model used by the second wearable apparatus. In some embodiments, the inference model of the first wearable apparatus may be the same as the inference model of the second wearable apparatus. However, in other embodiments, the inference model of the first wearable apparatus may differ from the inference model of the second wearable apparatus (e.g., the inference models may be different versions of the model). Similar to the discussion of the first update information, the second update information may include a second direction of a portion of a second gradient derived from one or more images captured by a camera present on the second wearable apparatus.

Also similar to the discussion above regarding the first update information, prior to sending the second update information to server 250, the second wearable apparatus may have derived the second direction from a comparison of at least two of the images captured by the camera present on the second wearable apparatus, or from a comparison of classification results. Furthermore, the second wearable apparatus may have derived the second direction to correct an image classification technique. In some embodiments, the second wearable apparatus may have derived the second direction from feedback received from a user of the second wearable apparatus. The feedback may include correction information associated with a classification of an object or a person depicted in at least one of the images captured by the camera present on the second wearable apparatus.

In some embodiments, the first update information may be insufficient to reconstruct any of the one or more images captured by the camera present on the first wearable apparatus, and/or the second update information may be insufficient to reconstruct any of the one or more images captured by the camera present on the second wearable apparatus. In other embodiments, the first update information may further include a magnitude of the portion of the first gradient and/or the second update information may further include a magnitude of the portion of the second gradient.

In step 1830, server 250 may analyze the first update information and the second update information to determine a global update to the inference model. For example, server 250 may determine the global update based on a gradient descent update of the inference model, a prediction made by the inference model, an aggregate of the first direction and the second direction, or a median of the first direction and the second direction. In some embodiments, server 250 may determine the global update by selecting as the direction of the global update one of the first direction and the second direction.

In step 1840, server 250 may transmit, via the data interface, the global update to a plurality of wearable apparatuses. The plurality of wearable apparatus may receive the update over network 240, and the inference model on each of the plurality of wearable apparatuses may be updated based on the global update. For example, each wearable apparatus may modify the inference model stored in a memory device based on the global update. In some embodiments, the global update may include a new version of an inference model to be used in lieu of a prior version of the inference model. In other embodiments, the global update may include a modification to an inference model (e.g., a modification or update to a particular version of the inference model). For example, the global update may include gradient modification information. The gradient modification information may include a new gradient for replacing or updating at least one gradient or parameter associated with the inference model, or the gradient modification information may include difference information for modifying at least one gradient or parameter associated with the inference model.

Consistent with some disclosed embodiments, the inference model may include a classifier to classify an input (e.g., an image) to the classifier. The classifier may include any suitable neural network including learning rules and/or algorithms, such as a convolutional neural network for image classification.

Assume $f(X, W)=C$ to be a function representation of the classifier, where X is a vector representing an input (e.g. image, video, etc.) to the classifier, W is a vector representing pre-learned parameters of the common classifier such as connection weights, and C is a vector representing a classification output of the classifier. For example, C may be a vector of scores for the possible classes, a signature to be compared to signatures of other inputs or any other information which encodes the classification of the given input X. The classifier may be trained on a training set of image-label pairs, $(X_1, y_1), \ldots, (X_n, y_n)$ using a cost or loss function such as: $Loss=\Sigma_i L(f(X_i, W), y_i)$. Training may be done off-line in advance or in a collaborative manner.

For example, a wearable apparatus may apply the inference model (e.g., function $f$) to a specific input $X_0$ (e.g., an image of bicycle captured by a camera present on the wearable apparatus) and receive an output $C_0$ (e.g., a classification of the image as a pedestrian), which is as incorrect classification.

It would be useful to provide feedback about such classification errors to a central system that could modify the inference model in order to avoid or reduce the chances of repeated errors. Furthermore, it would also be desirable to provide information about the errors in a manner that preserves the privacy of the user of the wearable apparatus (e.g., without providing the actual images captured by the wearable apparatus). That is, without sending the input $X_0$. For example, in the case where the model $f$ takes an input image of the user walking in his/her neighborhood, the user may not want to send the input image to a server (e.g., server 250). In some embodiments, the wearable apparatus may instead determine a local correction. The local correction may be computed by first computing the gradient of the loss function as follows:

$$\Delta W := \frac{\partial \text{Loss}(f(X_0, W), y_0)}{\partial W}$$

Next, an update step may be applied as: $W \leftarrow W - \eta \Delta W$, where $\eta$ is a small positive parameter referred to as a learning rate of the classifier. The update information may include a direction of a portion of the gradient $\Delta W$ derived from one or more images captured by the wearable apparatus. Alternatively, the update information may include a magnitude of the portion of the gradient $\Delta W$.

In some embodiments, the direction of the portion of the gradient $\Delta W$ may be derived from a comparison of at least two images. For example, image 1 captured by a wearable apparatus at time 1 may be classified correctly; image 2 captured at time 2 (time 2 is later than time 1) may be classified incorrectly; and image 3 captured at time 3 (time 3 is later than time 2) may be classified correctly again. By comparing those classifications, a direction of a portion of a gradient $\Delta W$ may be derived.

In some embodiments, the direction of the portion of the gradient $\Delta W$ may be derived to correct an image classification technique used in the inference model.

In the case in which a community of wearable apparatus users has the model parameters W (e.g., the model parameters are factory installed or synchronized), a server may also transmit $\nabla W$ to other users. The $\nabla W$ may not contain any details from the input $X_0$.

Further, the $\Delta W$ may represent a direction in the parameters space. It may have a meaning with respect to W, the current state of the inference model. Since W itself is not sent from the wearable apparatus to a server (e.g., to the cloud), no eavesdropper can use this information. Given a different set of parameters $\tilde{W}$, the same correction $\Delta W$ may signify a completely different request from a wearable device, so $\Delta W$ by itself does not reveal the true meaning of the request.

In the case where the classifier includes a convolutional neural network and the input is an image, parameters in W may include convolution kernels and hence may not signify a location in the image as they are applied throughout the image. The model $f$ may be trained to be invariant to most information in the input images. Each kernel may be applied over the whole image (or intermediate layer) and the corrective step may be shared throughout that space. For a specific entry $W_i$ correction $\Delta W_i$ here x, y are locations in the image. Since only the sum $\Delta W$ is available, there is no way to decompose it into meaningful information about the image $X_0$.

Further, the corrective step is additive and hence it is possible to send a combined corrective vector of several corrections: $\Delta W = \nabla W_1 + \nabla W_2 + \ldots$ of inputs $X_0, X_1, \ldots$.

The classifier may be further trained to maintain an optimal margin between classes. This means that a multi-class classifier which produces a classification for input $X_0$ may output the same classification result for all inputs within a radius around $X_0$. For example, if the classifier recognizes whether the user is indoors or outdoors, and given an input image $X_0$ which is classified as "indoors," there are infinitely many images $X_1$ that are "near" $X_0$ (in image space) that will also be classified as "indoors." Furthermore, W is usually a parameter of some feature that is used several times in the calculation of $f$ on different areas of the image (e.g., in a convolutional neural network).

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, Ultra HD Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A server-based system for determining a global update to an inference model and distributing the global update to a plurality of wearable apparatuses, the system comprising:
   a data interface; and
   at least one processing device programmed to:
   receive, via the data interface and from a first one of the plurality of wearable apparatuses, first update information associated with the inference model stored in a memory of the first wearable apparatus, the first update information including a first direction of a portion of a first gradient derived from one or more images captured by a camera present on the first wearable apparatus;

receive, via the data interface and from a second one of the plurality of wearable apparatuses, second update information associated with the inference model stored in a memory of the second wearable apparatus, the second update information including a second direction of a portion of a second gradient derived from one or more images captured by a camera present on the second wearable apparatus;

analyze the first update information and the second update information to determine the global update to the inference model; and transmit, via the data interface, the global update to the plurality of wearable apparatuses for modifying the inference model stored in the memories of the first wearable apparatus and the second wearable apparatus.

2. The system of claim 1, wherein the first update information is insufficient to reconstruct any of the one or more images captured by the camera present on the first wearable apparatus.

3. The system of claim 1, wherein the first update information further includes a magnitude of the portion of the first gradient.

4. The system of claim 1, wherein the first direction was derived from a comparison of at least two of the images captured by the camera present on the first wearable apparatus.

5. The system of claim 1, wherein the first direction was derived to correct an image classification technique.

6. The system of claim 1, wherein the first direction was derived from feedback received from a user of the first wearable apparatus.

7. The system of claim 6, wherein the feedback includes correction information associated with a classification of an object or a person depicted in at least one of the images captured by the camera present on the first wearable apparatus.

8. The system of claim 1, wherein the global update is based on a gradient descent update of the inference model.

9. The system of claim 1, wherein the global update is based on a prediction made by the inference model.

10. The system of claim 1, wherein the global update is based on an aggregate of the first direction and the second direction.

11. The system of claim 1, wherein the global update is based on a median of the first direction and the second direction.

12. The system of claim 1, wherein the at least one processing device is further programmed to select one of the first direction and the second direction, and wherein the global update to the inference model is based on the selected direction.

13. The system of claim 1, wherein the inference model includes a neural network.

14. The system of claim 13, wherein the neural network is a convolutional neural network.

15. The system of claim 1, wherein the inference model includes a regression model.

16. The system of claim 1, wherein the inference model includes a classifier.

17. A computer-implemented method for determining a global update to an inference model and distributing the global update to a plurality of wearable apparatuses, the method comprising:

receiving, via a data interface of a server and from a first one of the plurality of wearable apparatuses, first update information associated with the inference model stored in a memory of the first wearable apparatus, the first update information including a first direction of a portion of a first gradient derived from one or more images captured by a camera present on the first wearable apparatus;

receiving, via the data interface of the server and from a second one of the plurality of wearable apparatuses, second update information associated with the inference model stored in a memory of the second wearable apparatus, the second update information including a second direction of a portion of a second gradient derived from one or more images captured by a camera present on the second wearable apparatus;

analyzing, via at least one processing device, the first update information and the second update information to determine the global update to the inference model; and transmitting, via the data interface of the server, the global update to the plurality of wearable apparatuses for modifying the inference model stored in the memories of the first wearable apparatus and the second wearable apparatus.

18. The method of claim 17, wherein the first update information is insufficient to reconstruct any of the one or more images captured by the camera present on the first wearable apparatus.

19. A software product stored on a non-transitory computer-readable medium storing instructions for carrying out a method to determine a global update to an inference model and distribute the global update to a plurality of wearable apparatuses, the method comprising:

receiving, from a first one of the plurality of wearable apparatuses, first update information associated with the inference model stored in a memory of the first wearable apparatus, the first update information including a first direction of a portion of a first gradient derived from one or more images captured by a camera present on the first wearable apparatus;

receiving, from a second one of the plurality of wearable apparatuses, second update information associated with the inference model stored in a memory of the second wearable apparatus, the second update information including a second direction of a portion of a second gradient derived from one or more images captured by a camera present on the second wearable apparatus;

analyzing the first update information and the second update information to determine the global update to the inference model; and transmitting the global update to the plurality of wearable apparatuses for modifying the inference model stored in the memories of the first wearable apparatus and the second wearable apparatus.

20. The software product of claim 19, wherein the first update information is insufficient to reconstruct any of the one or more images captured by the camera present on the first wearable apparatus, and the second update information is insufficient to reconstruct any of the one or more images captured by the camera present on the second wearable apparatus.

* * * * *